US010818194B1

(12) United States Patent
Buscemi et al.

(10) Patent No.: US 10,818,194 B1
(45) Date of Patent: Oct. 27, 2020

(54) SYSTEMS AND METHODS FOR PROVIDING ACCESS TO INFORMATION, INSTRUCTIONS AND/OR TRAINING MATERIAL

(71) Applicant: CECELUMEN, LLC, Camarillo, CA (US)

(72) Inventors: James S. Buscemi, Camarillo, CA (US); Jim Webster, Manhattan Beach, CA (US)

(73) Assignee: CECELUMEN, LLC, Camarillo, CA (US)

( * ) Notice: Subject to any disclaimer, the term of this patent is extended or adjusted under 35 U.S.C. 154(b) by 0 days.

(21) Appl. No.: 15/870,948

(22) Filed: Jan. 13, 2018

Related U.S. Application Data

(63) Continuation-in-part of application No. 15/264,526, filed on Sep. 13, 2016.

(60) Provisional application No. 62/421,368, filed on Nov. 13, 2016, provisional application No. 62/217,956, filed on Sep. 13, 2015.

(51) Int. Cl.
| | | |
|---|---|---|
| *G09B 5/12* | (2006.01) | |
| *H04W 4/02* | (2018.01) | |
| *G09B 7/00* | (2006.01) | |
| *G09B 5/04* | (2006.01) | |
| *G09B 5/06* | (2006.01) | |
| *G09B 5/02* | (2006.01) | |

(52) U.S. Cl.
CPC ............... *G09B 5/125* (2013.01); *G09B 5/02* (2013.01); *G09B 5/04* (2013.01); *G09B 5/065* (2013.01); *G09B 7/00* (2013.01); *H04W 4/023* (2013.01)

(58) Field of Classification Search
USPC .............. 455/410, 411, 412.1, 414.1, 414.2, 455/418–420, 423–425, 456.1–457
See application file for complete search history.

(56) References Cited

U.S. PATENT DOCUMENTS

| | | |
|---|---|---|
| 2007/0081477 A1 | 4/2007 | Jakkahalli et al. |
| 2008/0130595 A1 | 6/2008 | Abdel-Kader |
| 2009/0011743 A1 | 1/2009 | Johanson et al. |
| 2009/0279492 A1 | 11/2009 | Montemurro et al. |
| 2011/0047603 A1 | 2/2011 | Gordon et al. |
| 2012/0084773 A1* | 4/2012 | Lee .......................... G06F 8/61 717/178 |

(Continued)

*Primary Examiner* — Suhail Khan
(74) *Attorney, Agent, or Firm* — Straub & Straub; Michael P. Straub; Stephen T. Straub

(57) ABSTRACT

Methods and apparatus for providing educational and/or other information to a user of a user device, in response to the receipt of one or more wireless signals, are described. Educational information is loaded into a user device along with information on locations where the information can be accessed and/or suggestions on how to position the user device to obtain access to the stored information and/or capture an image to be used in a virtual reality experience in which stored educational content is presented. Short range wireless signals are transmitted in an area corresponding to a device or apparatus to which training or other education information relates. Receipt of one or more wireless signals trigger access on a user's communications device to training information, operational information or other information such a service information relating to the apparatus or device associated with the short range wireless signal which is received.

19 Claims, 16 Drawing Sheets

(56) References Cited

U.S. PATENT DOCUMENTS

| | | | |
|---|---|---|---|
| 2012/0196535 A1* | 8/2012 | Jarosch | H04W 4/022 |
| | | | 455/41.2 |
| 2012/0202185 A1* | 8/2012 | Jabara | G09B 5/00 |
| | | | 434/350 |
| 2013/0124309 A1 | 5/2013 | Traasdahl et al. | |
| 2013/0128811 A1 | 5/2013 | Bradish et al. | |
| 2014/0181245 A1 | 6/2014 | Richardson et al. | |
| 2014/0194153 A1 | 7/2014 | Salkintzis | |
| 2015/0339948 A1* | 11/2015 | Wood | G06N 5/02 |
| | | | 434/219 |
| 2016/0163212 A1 | 6/2016 | Stuckey | |
| 2016/0381210 A1 | 12/2016 | Kenjalkar et al. | |
| 2017/0118306 A1* | 4/2017 | Madhvanath | H04W 4/029 |

* cited by examiner

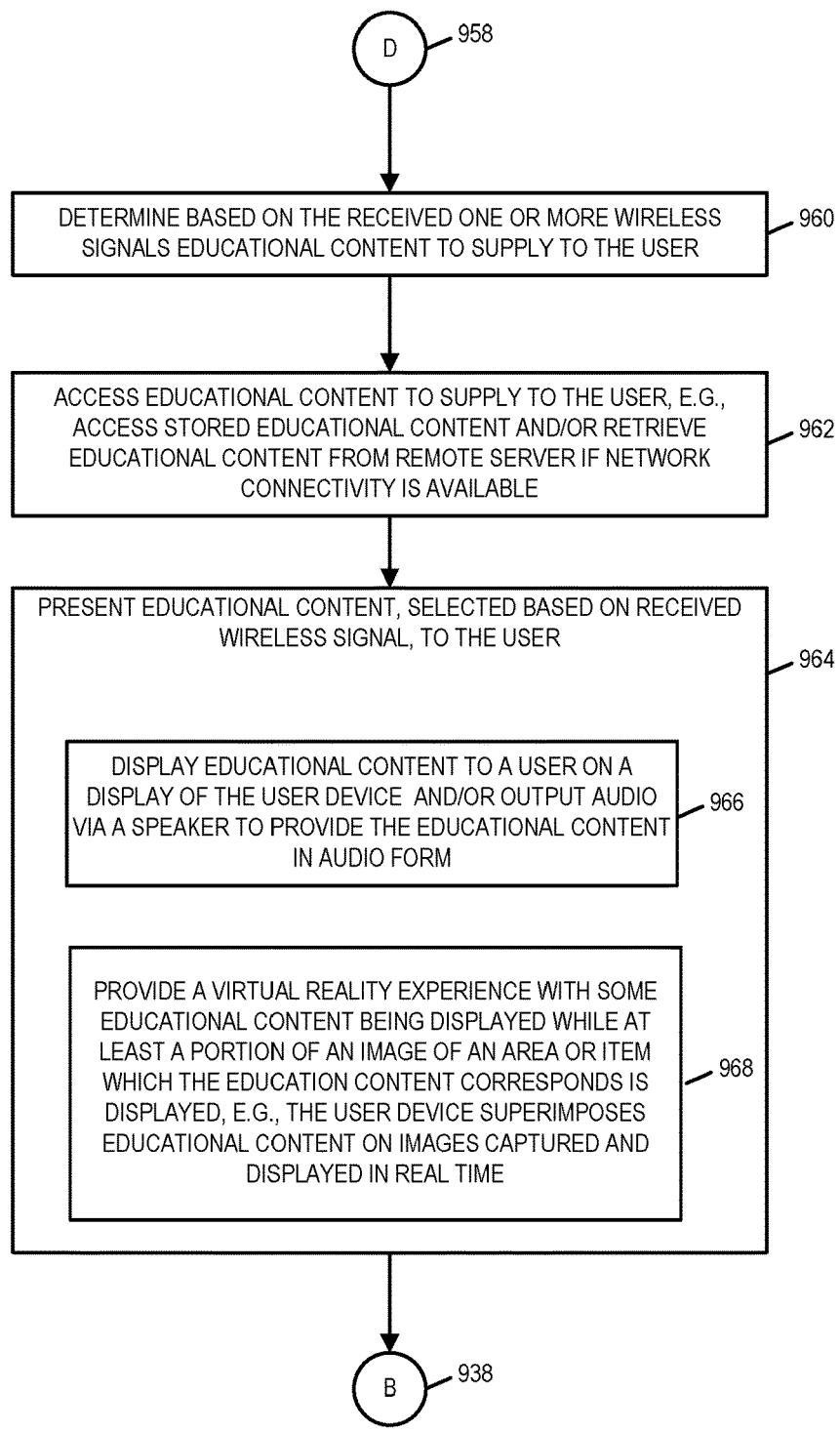
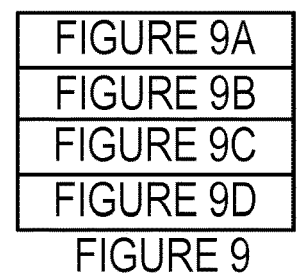
FIGURE 9D
FIGURE 9

SYSTEMS AND METHODS FOR PROVIDING ACCESS TO INFORMATION, INSTRUCTIONS AND/OR TRAINING MATERIAL

RELATED APPLICATIONS

The present application is related to the applications listed in the Application Data Sheet submitted herewith to which the present application claims benefit or priority under 35 USC § 120 and/or 35 U.S.C. § 119 with each such applications being hereby expressly incorporated by reference in their entirety. At least the following related applications are hereby incorporated by reference in their entirety: U.S. Provisional Patent Application 62/421,368 filed Nov. 13, 2016; U.S. patent application Ser. No. 15/264,526 filed Sep. 13, 2016 and 62/217,956 filed Sep. 13, 2017.

FIELD

The present application relates to methods and apparatus for providing access to information, instructions and/or training material, e.g., using one or more proximal technologies with information, instructions and/or training material being provided in response to detecting the receipt of one or more wireless.

BACKGROUND

In the field of education as well as many other fields, there is a need for methods and apparatus which can be used to train individuals to use equipment perform various activities and/or access information which is relevant to an activity which is to be performed.

For example it may be desirable to provide new recruits, e.g., in the Navy or other armed forces, or others training information relating to operation of a piece of equipment which they were not previously trained on. While multiple individuals may need to be trained it would be desirable if an individual user of a communications device, e.g., cell phone could be provided with training or other information relevant to the user's proximity to device or apparatus and/or customized for the individual device user based on the user's past training experience.

It would be desirable if such training information could be provided and/or accessed when the individual user is in proximity to the equipment to which the training relates and that training instructions are provided in the order in which they are intended to be presented, e.g., in a particular sequence intended for the user to understand the basis of operating the equipment before being presented with more advanced control options.

It would be desirable, if for example, on a ship a crewman could approach a device or other piece of equipment be provided with initial operating instructions before the crewman is provided with more advanced operating instructions or information. It would also be desirable if in at least some embodiments the crewman could easily document his/her completion of a particular training assignment before being presented with additional, e.g. more advanced training information relating to the particular piece of equipment to which a basic training assignment related.

While scheduled or planned training is important, there are situations where it might be desirable for a crewman or other individual to quickly pull up basic operating instructions for a piece of equipment for which he was not previously trained. For example, in the event or incident disabling an intended operator or a device such as a backup generator or fire fighting equipment it would be desirable if a potential operator of such equipment in an emergency could quickly access operating instructions and learn how to at least use the equipment in his/her proximity at a basic level in short order.

To avoid information overload in times of high stress, it would be desirable if rather than having to search through instructions for all or a larger number of pieces of equipment an individual could easily access instructions/information for devices nearby and which might be available to use.

In view of the above, it should be appreciated that there is a need for improved methods and/or apparatus for communicating, e.g., providing, information, training material and/or instructions to one or more individuals.

SUMMARY

In various embodiments, beacon transmitters are placed at various locations near pieces of equipment. The beacon transmitters may be WiFi, Bluetooth or another type of beacon transmitter. While WiFi or other non-cellular communication is used in some embodiments, beacon transmitters may be used to provide locally relevant training information, equipment information and or device operating instructions.

While in some embodiments training instructions and/or other information are wirelessly transmitted to a device of a user, e.g., a cell phone or tablet device, when in the proximity of the device or equipment to which the material relates, in other embodiments The information, instructions or other material is preloaded onto a users device and made available in response to the receipt of one or more wireless signals. For example the training information maybe loaded onto the devices, e.g., cell phones of crew members or other individuals who may need to be trained on equipment. When in proximity to the equipment on which the individual is to be trained the user's device detects a wireless signals from the equipment. The wireless signal includes, in various embodiments, an ID which is known to be associated with the corresponding piece of equipment. In response to detecting the wireless signal corresponding to the piece of equipment, a user's device retrieves, e.g., from local storage such as memory or from remote device, training information, instructions, devices status information and/or other information corresponding to the device or other equipment associated with a received wireless signal.

In some but not all embodiments, the retrieved information, instructions, etc. which maybe retrieved and automatically presented to a user, is limited to devices or other apparatus from which associated wireless signals are received. In this way a user is presented with locally relevant training information, material, etc., and is not overloaded with information and/or instructions for equipment which are not available to the user cell phone or other communication device. Thus, in a time of crisis or at other times such as during a training exercise a user of a communications device is provided with timely and relevant information which can be used to allow the user to obtain operating instructions without being overloaded with information relating to devices that are not in the proximity of the user of the communications device providing the instructions.

Upon completing a portion of a training exercise or training exercise a user may document the completion by answering one or more questions and verifying by detection of a wireless signal corresponding to a device to which the training exercise related that the user responded/answered the questions while in the proximity of the device on which the user was trained. The user's questions answers are stored and/or transmitted to a server along with proof of receipt of the wireless signal corresponding to the device or apparatus to which the training related. The device documents completion of the training exercise or portion of a training exercise prior to allowing the user to move to the next step of the training exercise.

While the methods and apparatus of the present invention are well suited for supporting training and access to information on how to operate a device or apparatus they can also be used to provide status information on a device such as a vehicle in the proximity of the user so that the user of the communications device can easily know its maintenance record and/or other information and know what action, e.g., service is to be provided to the vehicle. The vehicle's service records maybe automatically accessed, e.g., in response to receive a beacon signal having a beacon ID transmitted by a beacon transmitter on the device. Training or other instructions may take into consideration the service record of the device and provide the user of the communications device implementing the invention, in response to receipt of the beacon signal transmitted by the transmitter on the device being serviced, with service instructions which are specially tailored to the device based on its past service record, e.g., the user of the communications device maybe instructed to perform specific steps corresponding to the next engine service or maintenance operation to be performed given the vehicles past service records.

Since the methods and apparatus use communications devices, cell phones, which many individual's are already accustomed to using they are well suited for new recruits and/or other types of trainees with an understanding of how to use a cell phone or other communications device but may lack the training needed to operate particular devices or pieces of equipment they maybe exposed to and need to use.

Numerous additional features, embodiments and benefits of the various embodiments are discussed in the detailed description which follows. While various embodiments have been discussed in the summary above, it should be appreciated that not necessarily all embodiments include the same features and some of the features described above are not necessary but can be desirable in some embodiments.

BRIEF DESCRIPTION OF THE FIGURES

FIG. 2, which comprises the combination of FIGS. 2 A, 2B and 2C, shows the steps of a method implemented in accordance with one embodiment.

FIG. 9D is a fourth part of a flowchart of an exemplary method of providing information, e.g., educational information, in accordance with an exemplary embodiment.

FIG. 9 comprises the combination of FIGS. 9A, 9B, 9C and 9D.

DETAILED DESCRIPTION

Figure 1:
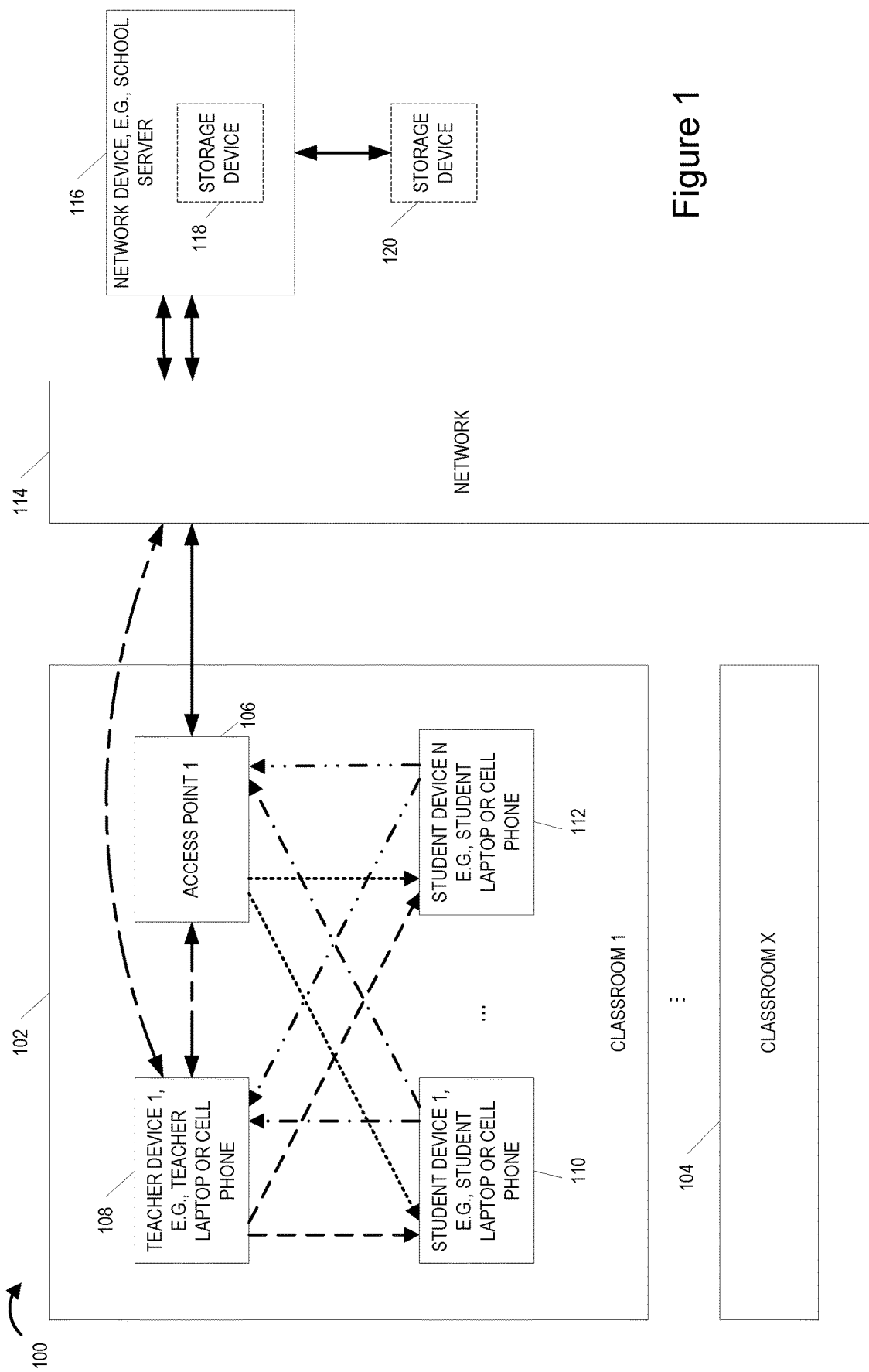
FIG. 1 illustrates an exemplary communications system, e.g., a communications system at a school, corresponding to one exemplary embodiment.

An application and/or collection of proximal applications executing on one or more user devices and/or a server are used to create an immersive dynamic training product/information providing system. A standard management and delivery framework for creating content to streamline instruction for enlisted personnel and/or other individuals is described where training and/or other information is provided to a user of a communications device in a timely manner based on the receipt of one or more wireless signals which can be used to determine proximity to a device, apparatus or location where training material, or instructions or other information are relevant. Training and/or other information providing technology is installed on one or more communications device, e.g., user devices such as cell phones. The training and/or information providing technology may take the form of an application running on a cell phone or other user device that is capable of detecting wireless signals and using the wireless signal or signals to determine what training information or other information is to be provided to a user of the communications device.

The delivery software technologies include one or more of a scalable backend web server, wireless signal detection algorithms, end-user mobile applications (Android and iOS), and a Content Management System (CMS) to produce a scalable web-based training material management and deployment solution and/or system. The methods and apparatus are well suited for training crews of ships and/or recruits. The methods and apparatus maybe to train seamen and/or members of the Navy or other armed forces where recruits may need to be trained on particular pieces of equipment or need to obtain access to operating information for equipment they were not previously trained on.

The methods and apparatus can be implemented using software executed by a processor or on a communications device such as a cell phone, laptop, server, etc. technologies and methods which support an identity service that weaves, e.g., associates, one or more wireless signals in a set of heterogeneous wireless signals on an enterprise into a Proximal Abstraction Layer to accelerate the deployment, e.g., distribution and accessing of content, of information and/or other material such as training content and/or interactive training exercises.

The methods and apparatus can use a common communications server to distribute a wide range of different types of information including training instructions, etc. as well as device status information such as vehicle service records. The content maybe uploaded to a server, associated with a wireless signal, e.g., beacon signal transmitted by a device with which the information is associated, and automatically downloaded and/or accessed by an application on a communications device which receives the wireless signal with which the information is associated.

Use of a common CMS allows for the assignment and deployment of training content to military personnel based on proximal location of interests.

Use of mobile applications, e.g., on a users cell phone, to detect wireless signals, respond to a detected wireless signal by retrieving content associated with the wireless signal and displaying the content to the user of the communications device running the mobile application allows for the use of a uniform rendering engine that will present users of different communications devices the same user experience resulting in the same or similar training experience for various individual being trained. The ability to present a consistent training experience on wireless communications devices of different types can simplify training of recruits.

The methods and apparatus described herein can accelerate the deployment and training with regard to Department of Defense (DoD) military systems by providing a training framework including content delivery for military personnel regardless of location at sea or ashore around the world. The methods and apparatus of the invention can reduce development and deployment costs by having a ubiquitous interface and training framework for creating and assigning content to location based contexts rather than developing complex intelligence or user-interfaces into each site's training application. The described methods and apparatus can also reduce lifecycle maintenance costs as well as personnel costs in deploying content to a complex array of locations through a common communications management system that can be used to communicate training as well as other information.

The methods and apparatus can use interfaces similar to those used for gaming technologies making training both fun and interactive while being relevant to the location and equipment near the user of a communications device implementing the mobile application on a cell phone or other communications device. Proximal content management and delivery technologies are used to provide locally relevant information in a timely manner. A centralized communication management server can be used for communicating training material for Government sites, locations, and work areas where connectivity would be costly or impossible with in some cases the training material being downloaded and stored on a communications device and made accessible in response to receipt of a wireless signal associated with the training or other information.

The methods and apparatus allow for managing, deploying, and viewing content by military personnel and/or others based on proximal locations, in order to reduce operational and lifecycle maintenance costs pertaining with training materials and manuals.

A Create Training Enterprise system element is a computer or other device including a processor, memory and/or display that is configured under control of the processor to provide a scalable framework solution which allows a user to create a unique wireless identity which allows for the collection, assignment, and management of heterogeneous wireless signals and training content to be organized for military personnel's reference depending on the assigned contextual location of applicability for the content. Hardware signals, such as Bluetooth LE and Wi-Fi, can be assigned to physical devices and/or organized in groups of devices allowing training content to be distributed to multiple locals seamlessly. Through the management of the wireless signals and training content, areas of regard can be established based on proximity which allows for greater mobile flexibility in a dynamic test environment.

A Create Training Content system element is a computer or other device including a processor, memory and/or display that is configured under control of the processor to provide a common user interface for creating any type of training or maintenance material for military end-users to reference. The content created from external vendors, such as lesson plans, training materials, or rich interactive content, or as created from within the embedded content creator, is encapsulated in a set of content that can be associated with a wireless signal or set of wireless signals. External Vendors as well as the user utilizing the content creator system, can provide training content in a wide array of forms, such as documents, videos, audio, interactive web pages, and other media.

A Deliver Training Content system is a system, e.g., server, including a computer or other device including a processor, memory and/or display element that can deliver content from the Training Enterprise as well as the wireless detection algorithms and user interface rendering engine which displays relevant proximal training content to military personnel per rules established in by a Training Enterprise or other entity or controller. The sets of information and/or training material that are assigned to a proximal location leverage a priority engagement system allowing for an order in content presentation. Advanced algorithms, e.g., methods and/or presentation sequence information, are utilized to balance and optimize the mobile device's battery usage and wireless scanning technologies. Upon detection of contextual wireless signals, associated content is sorted, prioritized, and rendered on the mobile device of a user allowing the military personnel or another individual access to relevant, e.g., equipment or location targeted, information, equipment operation instructions and/or situation ally relevant information or material as indicated by the detection of one or more wireless signals and the association of the instructions, information or other material with such signals.

FIG. 1 is a drawing of an exemplary communications system 100 in accordance with an exemplary embodiment. In exemplary system 100 there are a plurality of classrooms (classroom 1 102, . . . , classroom X 104), and each classroom includes an access point. While classrooms are shown, rather than classrooms the locations where the communications device are used may correspond to areas around equipment or other devices for which training material or other information is provided. While the methods will be discussed and explained in the context of a wireless coverage area corresponding to one or more classrooms, training areas near equipment maybe and sometime substituted for the classrooms with a training area corresponding to a wireless coverage are of one or more wireless transmitters, e.g., beacon transmitters, on or near a piece of equipment to which training relates.

For example classroom 102 includes access point 1 106. In various embodiments, the access point, e.g., access point 1 106, is located at a predetermined known location in the classroom and its coverage area encompasses the area of the classroom in which a teacher or student, with a wireless device, may be located. At different times a particular teacher and/or a set of students, each with a wireless communications device, may be, and sometimes are, in a particular classroom, e.g., corresponding to a scheduled class session. As shown in FIG. 1, classroom 1 102 includes teacher device 1, e.g., a teacher laptop or mobile device, access point 1 106, and a plurality of student devices (student device 1, e.g., a student laptop or mobile device, . . . , student device N, e.g., a student laptop or mobile device). Communications system 100 further includes a network 114, and a network device 116, e.g., a school server. In some embodiments, the network device 116 includes a storage device 118. In some embodiments, communications system 100 includes a storage device 1020 which is accessible to the network device 116.

The student devices (110, . . . , 112) communicate with the teacher device 108 and/or the access point 1 106 via wireless signaling. The teacher device 108 and/or the access point 108 communicates with the network device 116 via network 114, e.g., an infrastructure network which may included wired and/or wireless communications paths. In various embodiments, student devices (110, . . . , 112) communicate with the server 116 via teacher device 108 and/or access point 1 106 and network 114.

Communications system 100 is used to communicate attendance related information, e.g., take attendance of a classroom session, communication work submission related information, and communicate test related information. In some embodiments, the teacher device 1 108 and/or the access point 106 transmits beacons during a class session, e.g., to initiate an attendance check, which are detected by student devices in the classroom 1 102. In some embodiments, the student devices (110, . . . , 112) transmit signals, during a class session, which are detected by teacher device 108 and/or access point 106, e.g., as part of attendance. In some embodiments, the teacher device 108 and/or the access point 1 106 are administrator devices, e.g., with a different level of access with regard to network device 116 and stored information accessible by network device 116.

Figure 2A:
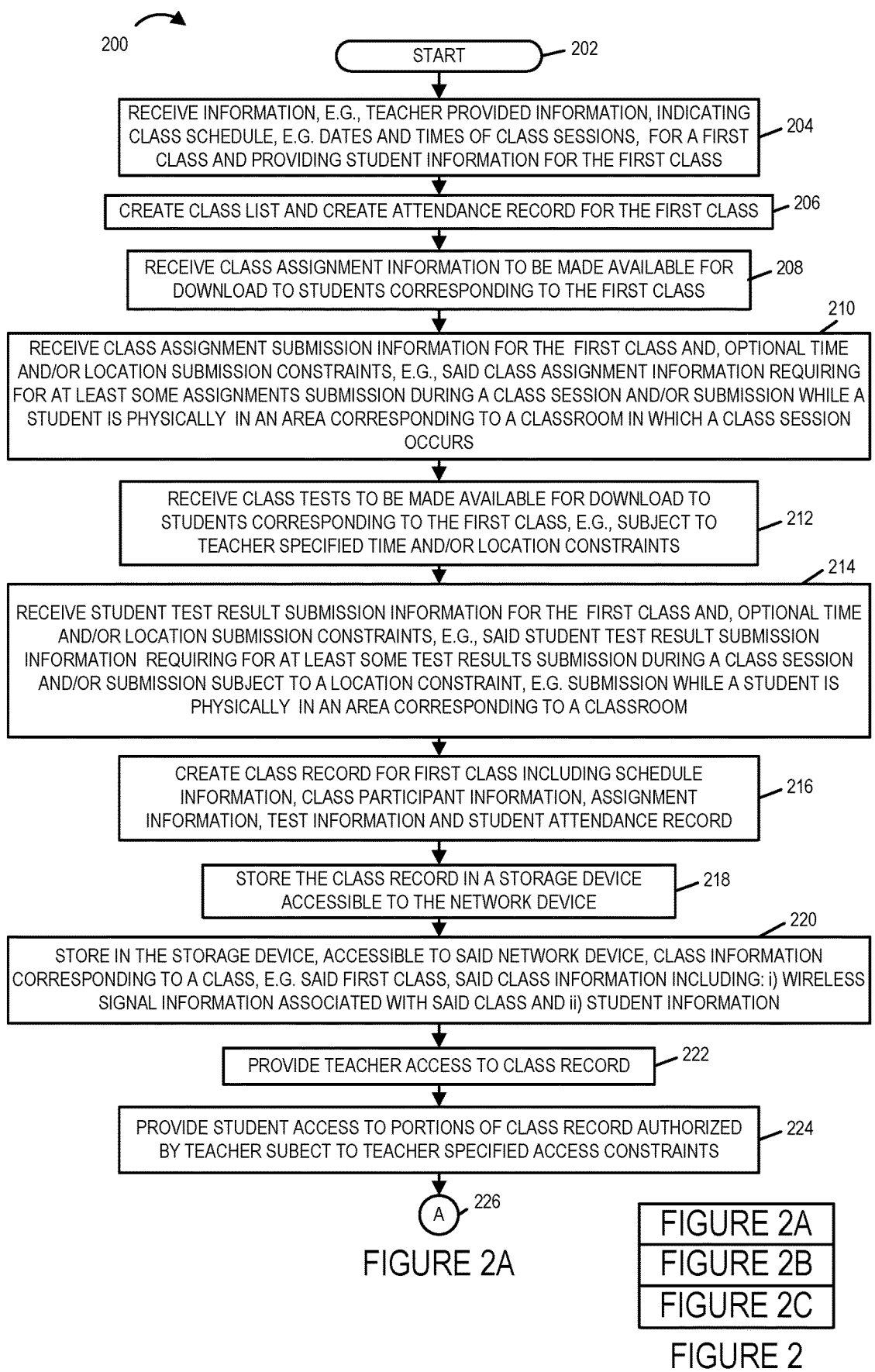
FIG. 2A is a first part of a flowchart showing exemplary steps of a method which may be implemented in the system of FIG. 1.
Figure 2B:
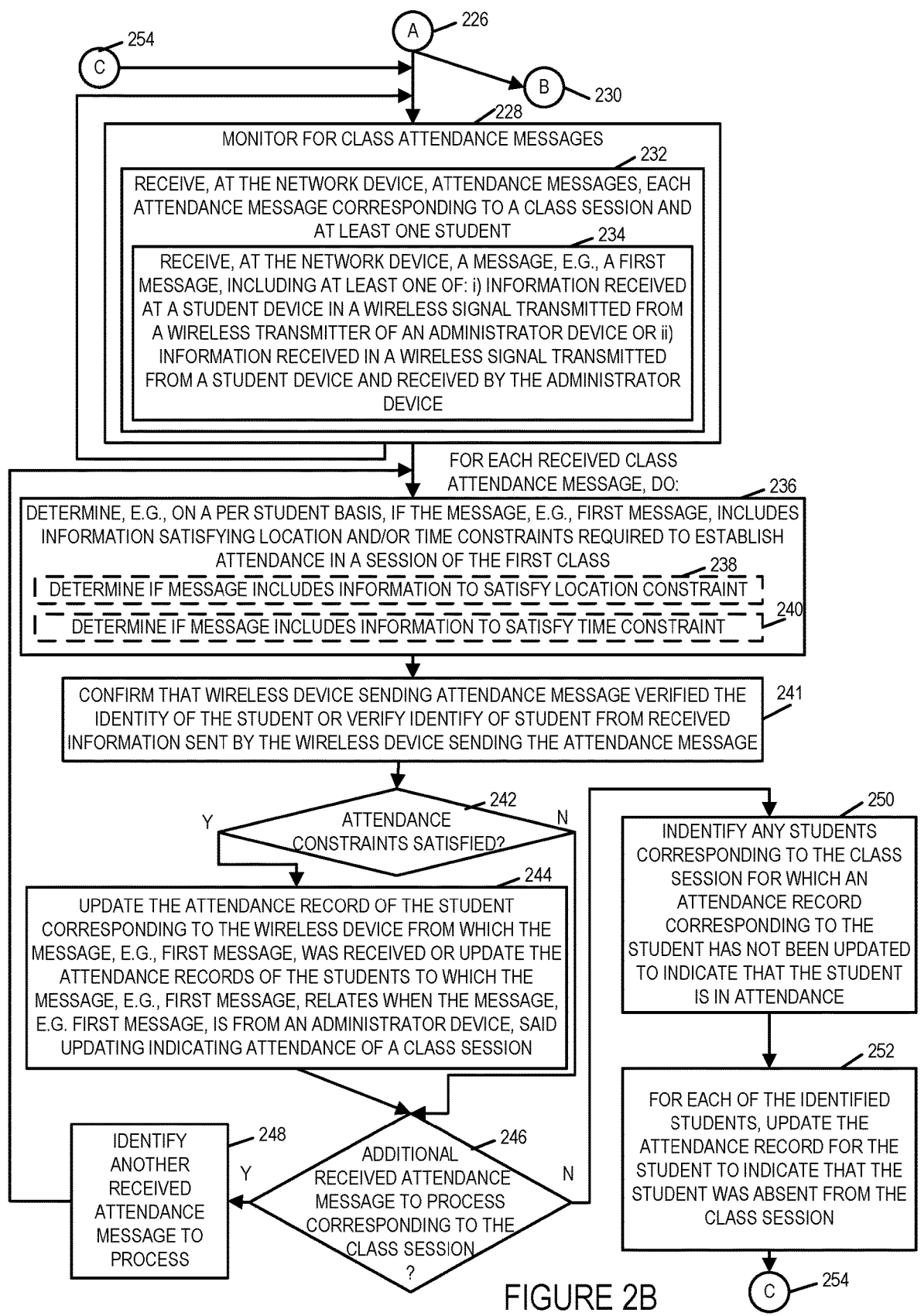
FIG. 2B is a second part of a flow chart showing exemplary steps of a method which may be implemented in the system of FIG. 1.
Figure 2C:
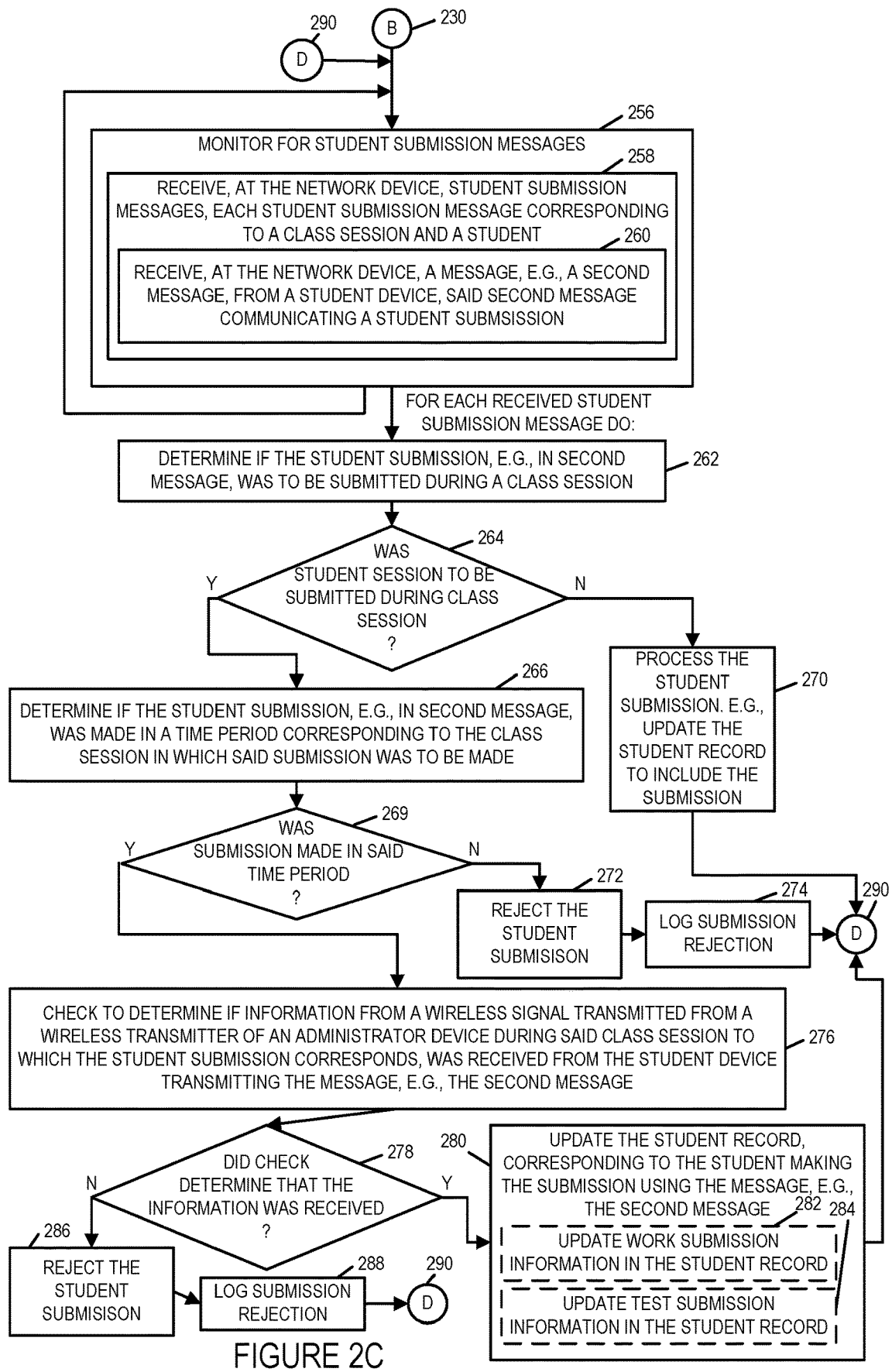
FIG. 2C is a third part of a flowchart showing exemplary steps of a method which may be implemented in the system of FIG. 1.

FIG. 2, comprising the combination of FIG. 2A, FIG. 2B and FIG. 2C, is a flowchart 200 of an exemplary method in accordance with an exemplary embodiment, e.g., an exemplary method of operating a network device, e.g. network device 1016, in accordance with an exemplary embodiment. Operation of the exemplary method starts in step 202 in which the network device is powered on and initialized. Operation proceeds from step 202 to step 204. In step 204 the network device receives information, e.g., teacher provided information, indicating a class schedule, e.g., dates and times of class sessions, for a first class and providing student information for the first class. Operation proceeds from step 204 to step 206.

In step 206 the network device creates a class list and creates an attendance record for the first class. Operation proceeds from step 206 to step 208. In step 208 the network device receives class assignment information, e.g., teacher provided class assignment information, to be made available for download to students corresponding to the first class. Operation proceeds from step 208 to step 210.

In step 210 the network device receives class assignment submission information for the first class and, optional time and/or location submission constraints, e.g., said class assignment information requiring for at least some assignment submission during a class session and or submission while a student is physically in an area corresponding to a classroom in which a class session occurs. For example, the class assignment submission information includes class assignment submission information for a first work assignment which includes a first set of problems to be solved, information indicating that the first work assignment is to be submitted during the first 5 minutes of the second class session from a location within the classroom in which the second class session is scheduled, and is to be submitted by the student who is attending the class and should include specific requested information to authenticate the student. Operation proceeds from step 210 to step 212.

In step 212, the network device receives class tests to be made available for download to students corresponding to the first class, e.g., subject to teacher specified time and/or location constraints. For example, class tests received include, e.g., a mid-term exam corresponding to the first class, which can be downloaded on class session corresponding to the scheduled mid-term during the class session in the classroom in which the mid-term is located by students registered for the first class. Operation proceeds from step 212 to step 214.

In step 214, the network device receives student test result submission information for the first class and, optional time and/or location submission constraints, e.g., said student test result submission information requiring for at least some test results submission during a class session and/or submission subject to a location restraint, e.g., submission while a student is physically in an area corresponding to a classroom. Operation proceeds from step 214 to step 216. In step 216 the network device creates a class record for the first class including schedule information, class participant information, assignment information, test information and a student attendance record. Operation proceeds from step 216 to step 218.

In step 218 the network device stores the class record in a storage device accessible to the network device. For example, network device 116 stores the class record for class 1 in storage device 118, e.g., memory, located in network device 116, or in storage device 120, which is accessible to network device 116 but external to network device 116. Operation proceeds from step 218 to step 220.

In step 220 the network device stores in the storage device, accessible to said network device, class information corresponding to a class, e.g., said first class, said class information including wireless signal information associated with said class and ii) student information. In some embodiments, the wireless signal information includes per student wireless signal identification information, said per student wireless signal identification information including for at least a first student: first student wireless signal identification information which includes information, e.g., a beacon ID for student 1, that can be used to identify a wireless signal transmitted by a first student device, e.g., a student laptop of cell phone, corresponding to the first student. In some embodiments, the student information includes per student information for at least a first student: including first student identification information corresponding to the said first student for which first student wireless signal identification information is stored, e.g., one student name or identifier for each student, said student identification information including at least a first student name or first student identifier corresponding to the first student. In some embodiments, the per student information for the first student further includes first student authentication information for authenticating at least one of the first student identification information communicated via the first student's wireless device and/or first student submissions communicated via the first student's wireless device. Operation proceeds from step 220 to step 222.

In step 222 the network device provides teacher access to the class record. Operation proceeds from step 222 to step 224, in which the network device provides student access to portions of the class record authorized by the teacher subject to teacher specified access constraints. Operation proceeds from step 224, via connecting node A 226, to step 228 and, via connecting node B 230, to step 256.

In step 228 the network device monitors for class attendance messages. Step 228 includes step 232 in which the network device receives, at the network device, attendance messages, each attendance message corresponding to a class session and at least one student. In some embodiments, the network device receives an individual received attendance message corresponding to each student which is present, e.g., an attendance message being sourced from an individual student. In some other embodiments, the network device receives an aggregated attendance message corresponding to a class session, e.g., with the aggregation of student presence information being performed by an administrator device, e.g., a teacher's communications device or an access point.

Step 232 includes step 234 in which the network device receives, at the network device, a message, e.g. a first message, including at least one of: i) information received at a student device in a wireless signal transmitted from a wireless transmitter or an administrator device or ii) information received in a wireless signal transmitted from a student device and received by the administrator device.

In some embodiments, the first message is a class attendance message from a first student device, and said first message includes at least a portion of information, e.g., a beacon id corresponding to and transmitted by the access point in the classroom or a beacon id corresponding to and transmitted by the teacher device of the teacher of the class, included in the wireless signal received by the first student device.

In some embodiments, the first message is administrator device generated class attendance message, which is a forwarded version of a received class attendance message from a first student device.

In some embodiments, the first message is an administrator device generated class attendance message including information received in a wireless signal transmitted from the first student device and received by the administrator device. In some embodiments, the first message is an administrator device generated class attendance message including information received in a wireless signal transmitted from the first student device and received by the administrator device, and further including information received in a wireless signal transmitted from a second student device and received by the administrator device, e.g., the administrator generated attendance message aggregates received information from multiple students.

In some embodiments, the administrator device is one of an access point corresponding to a classroom where said class is conducted of a teacher device of said class, wherein said teacher device is a wireless device. In some such embodiments, the teacher device is one of a cell phone or laptop.

With regard to the information received at a student device in a wireless signal transmitted from a wireless transmitter or an administrator device, in one example, in an exemplary embodiment, a message may be sent from a student device, and the message includes wireless signal information that was received by the student device while the student device was in class, and the wireless signal information that was received by the student device while in class includes, e.g., a beacon id or other beacon information which is being transmitted by an administrator device, e.g., a teacher device such as a teacher laptop computer or a teacher cell phone, or an access point associated with the class, e.g., an access point located in the classroom in which the class session is scheduled.

With regard to the information received in a wireless signal transmitted from a student device and received by the administrator device, in another example, in an exemplary embodiment, student devices, e.g., student cell phones or laptops may transmit beacons or other signals which are transmitted to administrator device, e.g. the teacher device or access point associated with a class, and are reported to the network device by administrator device, e.g., the teacher device or AP associated with the class.

Operation proceeds from step 228 to step 236. In step 236 the network device determines, e.g., on a per student basis, if the message, e.g., the first message, includes information satisfying location and/or time constraints required to establish attendance in a session of the first class. For example, the network device checks the first message to determine if the first message includes information received during a time window corresponding to a class session of the first class and checks to determine that the first message was received in an area corresponding to the first class. For example, the network device checks that the first message includes information that was transmitted and received during a time window corresponding to the first class and which was transmitted by the teacher's device or an AP corresponding to the first class thus indicating that the signal was received in the proximity of the first class. In this way both time both time and location constraints are tested to determine if both the time and location constraints are satisfied.

Step 236 includes step 238 and/or step 240. In step 238 the network device determines if the message, e.g., the first message, includes information to satisfy the location constraint. For example, does the first message include information indicating that a first student, which is registered for the first class was physically located within the classroom corresponding to the first session of the first class. In step 240 the network device determines if the message, e.g., the first message, includes information to satisfy the time constraint. For example, does the first message include information indicating that a first student, which is registered for the first class was physically located within the classroom corresponding to the first session of the first class during the scheduled date of the first session of the first class during the time of the scheduled first session of the first class. In some embodiments, the time check corresponding to a short interval during the first session, e.g., the first two minutes of the first session of the first class. In some embodiments, as part of the time check the student in the first class performs one or more predetermined authentication operations during the predetermined time interval, e.g., enters an ID number, a password, inputs biometric information, e.g., a thumbprint, a face photo, etc. In some embodiments, the time interval is intentionally short enough to make it difficult or not possible for a single person to enter attendance information on two devices corresponding to two students. In some embodiments, attendance checks are taken at multiple times in a session, e.g., at the beginning and at the end. In some embodiments, attendance checks are performed at random or pseudo-random times during a class session. In some embodiments, the number of attendance checks performed during a session varies, e.g., with a random or pseudo-random number of checks being performed per session.

Operation proceeds from step 236 to step 241 wherein a student identity check is made. In step 241, the network device determines if the wireless device sending the attendance message has verified the identity of the student, e.g., based on a fingerprint scan or captured image of the student or some other check, e.g., using stored information in the student device or supplied to the student device from the network node or, in the case where the wireless device sending the message did not check and confirm the student's identity before sending the message verifies the identify of the student form information sent to the network node from the wireless device sending the attendance message. In some embodiments the wireless device sends, either with the attendance message or in a separate message information which can be used to confirm the identity of the student corresponding to the wireless terminal and the received information is checked instep 241. For example, the network device, e.g., network node implementing the method of FIG. 2, may receive a captured image or fingerprint scan of the student and check it against an image or fingerprint scan stored in the network node to make sure it matches the student whose attendance is being updated by the attendance message. Thus, the identify check maybe performed in the wireless device sending the attendance message or in the network node implementing the method shown in FIG. 2 with the check being based, at least in some embodiments, on biometric information captured by the wireless device sending the attendance message.

In step 242 if the attendance constrains were determined to be satisfied, e.g., based on the information in the received first message or sent with the first message, then operation proceeds from step 242 to step 244; otherwise, operation proceeds from step 242 to step 246. For example, if any time, location or identify checks preformed in steps 236 or 241 fail, e.g., operation proceeds to step 246 without the attendance record of the student corresponding to the wireless device being updated. However if the checks were satisfied operation proceeds to step 244. In some embodiments, when a check associated with an attendance message fails the message is logged as well as the reason for the failure, e.g., time, location or identity check not being satisfied. The teacher and/or student maybe and sometimes is notified of the failure via a real time wireless message during the class allowing the attendance issue to be checked and resolved by the teacher and/or student before the class session is over or immediately after the class session allowing for reliable attendance records even where hardware or other issues may have resulted in a failure to automatically update an attendance record properly. The notification of failures also allows a teacher to quickly become aware of attempts defeat identify checks, etc. allowing a teacher to identify an imposter who may have attempted to replace a student to take a test or for some other reason.

In step 244, which is performed when the checks relating to an attendance message were passed, the network device updates the attendance record of the student corresponding to the wireless device from the message, e.g., first message was received or updates the attendance records of the student to which the first message, e.g. first message, relates when the message, e.g., first message, is from an administrator device, said updating indicating attendance of a class session for a student whose received information is determined to satisfy the constraints. Operation proceeds from step 244 to step 246.

In step 246 the network device checks if there is additional received attendance message to process corresponding to the class session. If the network device determines that there is an additional received attendance message to process corresponding to the class session, then operation proceeds from step 246 to step 248, in which the network device identifies another received attendance message to process. Operation proceeds from step 248 to step 236.

Returning to step 246, if the network device determines that there is an additional received attendance message to process corresponding to the class session, then operation proceeds from step 246 to step 250, in which the network device identifies any students corresponding to the class session for which an attendance record corresponding to the student has not been updated to indicate that the student is in attendance. Operation proceeds from step 250 to step 252. In step 252 the network device updates, for each of the identified students of step 250, the attendance record for the student to indicate that the student was absent for the class session. Operation proceeds from step 252, via connecting node C 254 to step 228.

Returning to step 256, in step 256 the network device monitors for student submission messages. Step 256 includes step 258 in which the network device receives at the network device, student submission messages, each student submission message corresponding to a class session and a student. Step 258 includes step 260 in which the network device receives at the network device a message, e.g., a second message, from a student device, said second message communicating a student submission. Operation proceeds from step 256 to step 262.

In step 262 the network device determines if the student submission, e.g., in the second message, was to be submitted during a class session. Operation proceeds from step 262 to step 264. If the determination of step 262 was that the student submission was to be submitted during a class session, then operation proceeds from step 264 to step 266; otherwise, operation proceeds from step 264 to step 270. In step 270 the network device processes the received student submission, e.g., the network device updates the student record to include the received student submission of the received second message. Operation proceeds from step 270 to connecting node D 290.

Returning to step 266, in step 266 the network device determines if the student submission, e.g., in the second message, was made in a time period corresponding to the class session in which said submission was to be made. Operation proceeds from step 266 to step 269. In step 269, if the determination of step 266 was that the submission was made in the time period corresponding to the class session in which said submission was to be made, then operation proceeds from step 269 to step 276; otherwise, operation proceeds from step 269 to step 272 in which the network device rejects the student submission since the student submission was made outside the time period corresponding to the class session in which the submission was to be made. Operation proceeds from step 271 to step 274 in which the network device logs the submission rejection. Operation proceeds from step 274 to connecting node D 290.

Returning to step 276, in step 276 the network device checks to determine if information from a wireless signal transmitted from a wireless transmitter of an administrator device during said class session to which the student submission corresponds, was received from the student device transmitting the message, e.g., the second message. Operation proceeds from step 276 to step 278. In step 278 if the check of step 276 determines that the information from a wireless signal transmitted from a wireless transmitter of an administrator device during said class session to which the student submission corresponds, was received from the student device transmitting the message, e.g., the second message, then operation proceeds from step 278 to step 280 unless an identity check is also to be made in which case step 241 would be performed prior to accepting the submission. If in step 278 it was determined that the information indicating receipt of a signal corresponding to the class area was not received operation proceeds from step 278 to step 286 in which the network device rejects the student submission. Rejection of the submission will also occur in embodiments where an identity authentication check such as the one in step 241 is required before accepting the submission and the identity authentication check fails. Thus in some embodiments acceptance step 288 is conditional on a successful identity authentication which is the same as or similar to that performed in step 241 but before acceptance of a student submission. In the case where a submission is to be rejected, operation proceeds from step 286 to step 288 in which the network device logs the submission rejection. Logging of the submission rejection in some embodiments includes storing of the submission so that it can be reviewed in the future along with information provided with the submission. The teacher and/or student maybe and often is notified of the submission rejection by a message being sent to the teacher and/or student device. Operation proceeds from step 288 to connecting node D 290.

Returning to step 280, in step 280 the network device updates the student record, corresponding to the student making the submission using the message, e.g., the second message after successful completion of the various submission related checks. In various embodiments, the submission is one or a work assignment corresponding to the class session or student test results corresponding to a class test to be taken during the class session. Step 280 includes step 282 or step 284 depending upon the type of student submission. In step 282 the network device updates work submission information in the student record. In step 284 the network device updates test submission information in the student record. Operation proceeds from step 280 to connecting node D 290. Operation proceeds from connecting node D 290 to the input of step 256.

In some embodiments, the per student information for the first student further includes, per student class records including a first student class record for said first class including: student attendance information indicating one or more dates of attendance by the first student in the first class. In some such embodiments, said first student class record for said first class further includes: a first student work submission for the first class; and time and date information indicating the time and date the first student work submission was submitted by the first student for the first class. In some embodiments, said first student class record for said first class further includes: a first student work submission for the first class; and time and date information indicating the time and date the first student work submission was submitted by the first student for the first class. In some such embodiments, said first student class record for said first class further includes: a first student test submission for the first class; and time and date information indicating the time and date the first student test submission was submitted by the first student for the first class.

Figure 3:
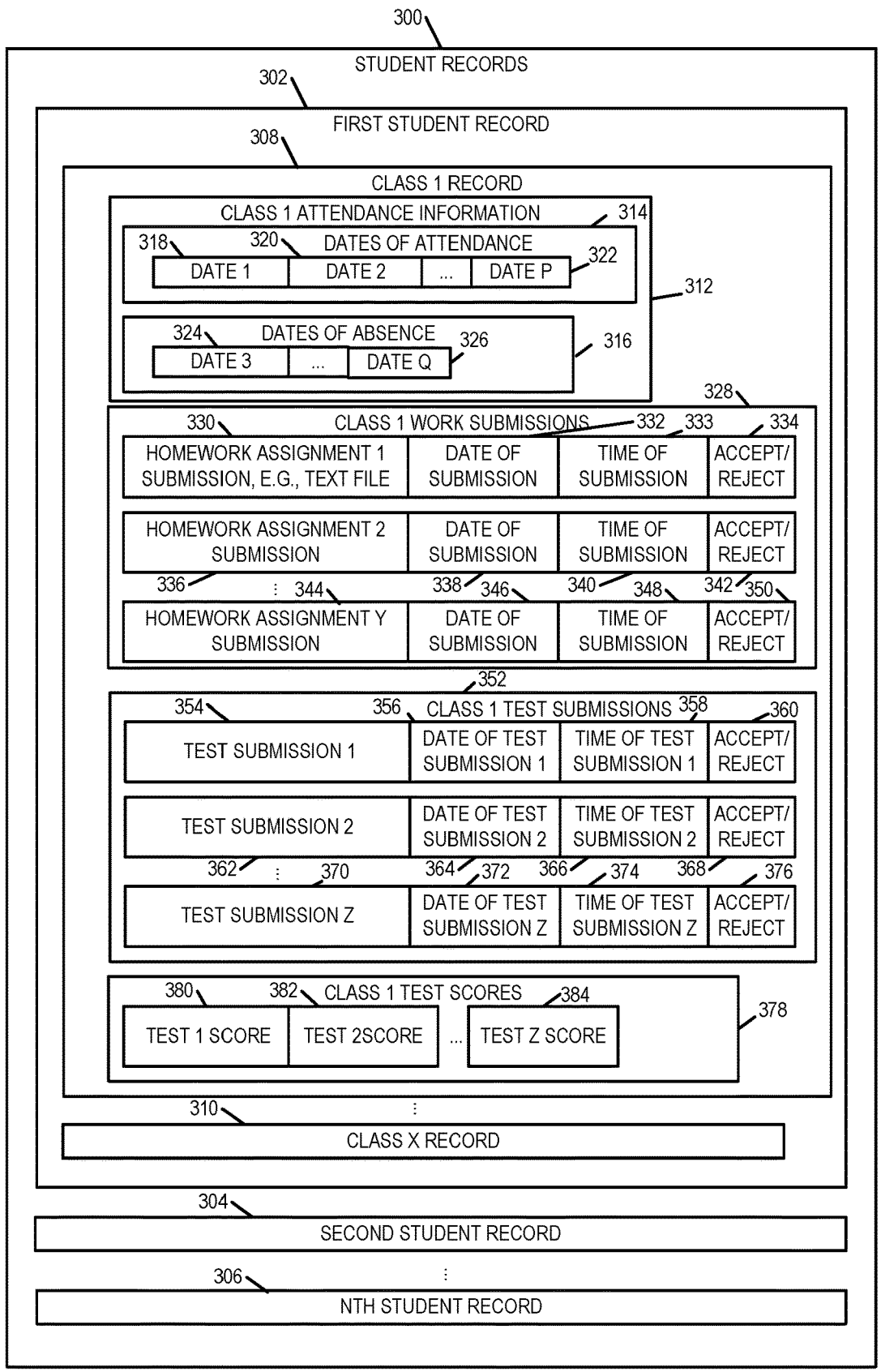
FIG. 3 illustrates exemplary student records which may be stored, accessed and used by the network node, e.g., school server, shown in FIG. 1.

FIG. 3 is a drawing of exemplary student records 300 in accordance with an exemplary embodiment. Exemplary student records 300 includes a plurality of student records (first student record 302, second student record 304, . . . , Nth student record 306). First student record 202 includes a plurality of class records (class 1 record 312, . . . , class X record 310, each class record corresponding to a different class for which the first student is a member, e.g., for which the first student is registered to attend. Class 1 record 308 includes class 1 attendance information 312, class 1 work submissions 328, class 1 test submissions 352, and class 1 test scores 378.

Class 1 attendance information 314 includes recorded dates of attendance 314 and recorded dates of absence 316. Recorded dates of attendance 314 includes date 1 318, date 2 320, . . . , date P 322, where each recorded data of attendance is a date of a class 1 class session in which the first student was determined to be present in the class, e.g., based on received attendance messages. Recorded dates of absence 316 includes date 3 324, . . . , date Q 326, where each recorded data of absence is a date of a class 1 class session in which the first student was determined to be absent from the class, e.g., based on the lack of a received attendance message corresponding to the first student and a session of the first class satisfying attendance acceptance constraints.

Class 1 work submissions 328 includes a plurality of sets of information corresponding to class 1 homework assignments which are submitted by the first student. For example, class 1 work submissions 328 includes homework assignment 1 submission 330, e.g., a text file, the date of submission 332 of homework assignment 1, the time of submission 333 of homework assignment 1, and accept/reject information 334 indicating whether homework assignment 1 is deemed accepted or rejection, e.g., based on submission criteria. For example, an assignment may be deemed rejected for having been submitted on a wrong date and/or time, e.g., the submission was late. In various embodiments, the accept/rejection information 334 further includes a reason for rejection in the event of a rejection and supporting information. Rejected submitted assignments are logged and recorded, e.g., allowing for a subsequent challenge to the rejection, e.g., an initial rejection may be overwritten based on valid accepted excuse. Class 1 work submissions 328 further includes homework assignment 2 submission 336, the date of submission 338 of homework assignment 2, the time of submission 340 of homework assignment 2, and accept/reject information 342 indicating whether homework assignment 2 is deemed accepted or rejection, e.g., based on submission criteria. Class 1 work submissions 328 further includes homework assignment Y submission 344, the date of submission 346 of homework assignment Y, the time of submission 348 of homework assignment Y, and accept/reject information 350 indicating whether homework assignment Y is deemed accepted or rejection, e.g., based on submission criteria. In some embodiments, some homework assignments are required to be submitted during a particular class session and/or during a particular time during the class session.

Class 1 test submissions 352 includes a plurality of sets of information corresponding to class 1 tests which are submitted by the first student. For example, class 1 test submissions 352 includes test submission 1 354, e.g., a file of test 1 first student generated test answers, the date of submission 356 of test submission 1, the time of submission 358 of test submission 1, and accept/reject information 360 indicating whether test submission 1 is deemed accepted or rejected, e.g., based on submission criteria. For example, an assignment may be deemed rejected for having failed one or more of: a submission date check, a submission time range check, a submission location check, e.g., based on reported received beacon signal information being transmitted during the test in the classroom in which the test was scheduled by and administrator device, a submission identity check, e.g., based student identity information and/or student biometrics, used to verify the identify of the student.

Class 1 test submissions 352 further include test submission 2 362, e.g., a file of test 2 first student generated test answers, the date of submission 364 of test submission 2, the time of submission 366 of test submission 2, and accept/reject information 368 indicating whether test submission 2 is deemed accepted or rejected, e.g., based on submission criteria. Class 1 test submissions 352 further includes test submission Z 370, e.g., a file of test Z first student generated test answers, the date of submission 372 of test submission Z, the time of submission 374 of test submission Z, and accept/reject information 376 indicating whether test submission Z is deemed accepted or rejected, e.g., based on submission criteria.

Class 1 test scores 378 includes a plurality of sets of test scores for the first student corresponding to class 1 tests, e.g., which are submitted by a grader, e.g., the class 1 teacher, of the class 1 tests. Class 1 test scores 378 for the first student includes class 1 test 1 score 380, class 1 test 2 score 382 and class 1 test Z score 384.

Figure 4:
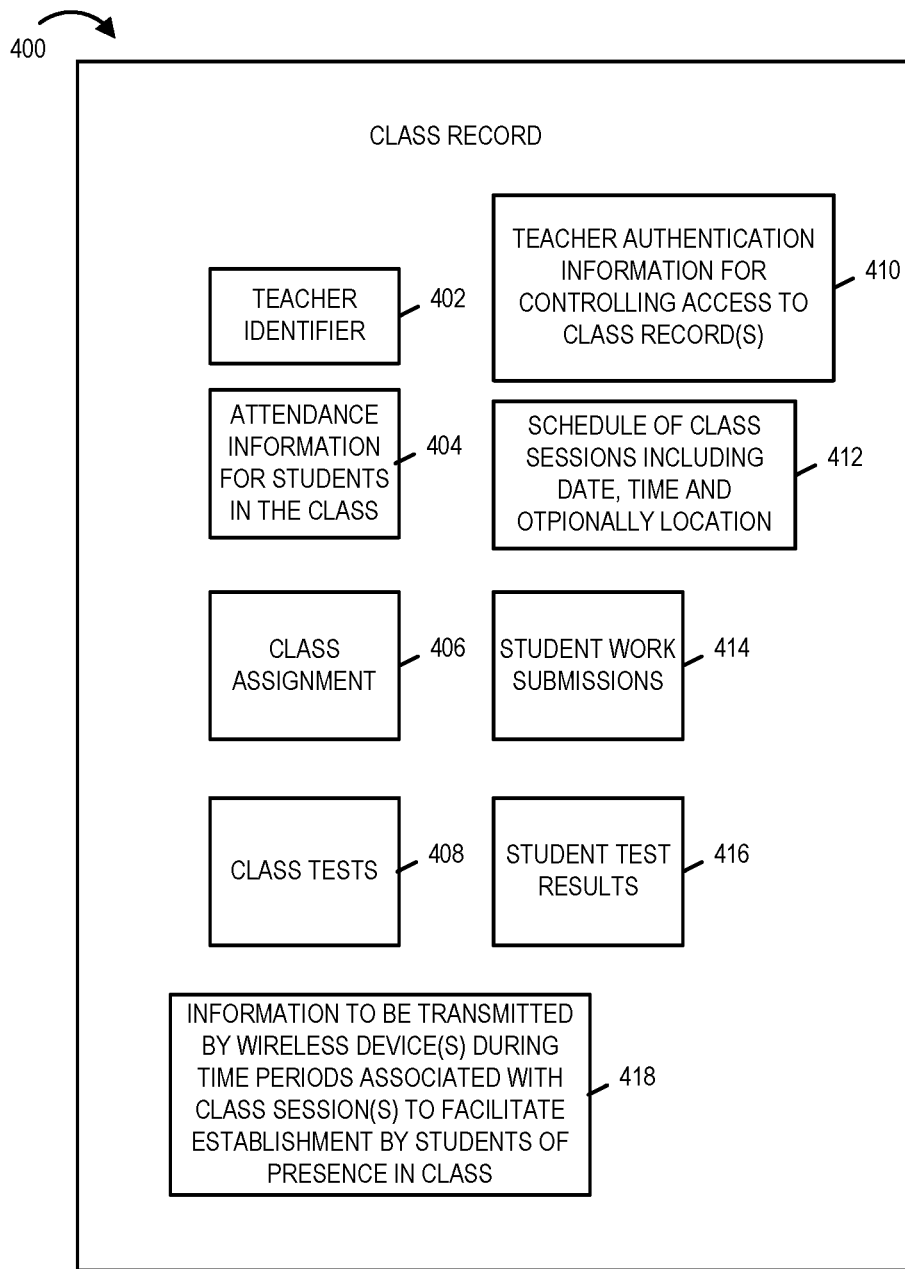
FIG. 4 illustrates and exemplary class record which may be stored, accessed and used by the network node, e.g., school server, shown in FIG. 1.

FIG. 4 is a drawing of exemplary class record 400 in accordance with an exemplary embodiment. Exemplary class record 400 includes a teacher identifier 402, attendance information for students in the class 404, class assignments 406, class tests 408, teach authentication information for controlling access to class record(s) 410, a schedule of class sessions including date, time and optionally location 412, student work submissions 414, student test results 416 and information 418 to be transmitted by wireless device(s) during time periods associated with class session(s) to facilitate establishment by students of presence in the class.

Figure 5:
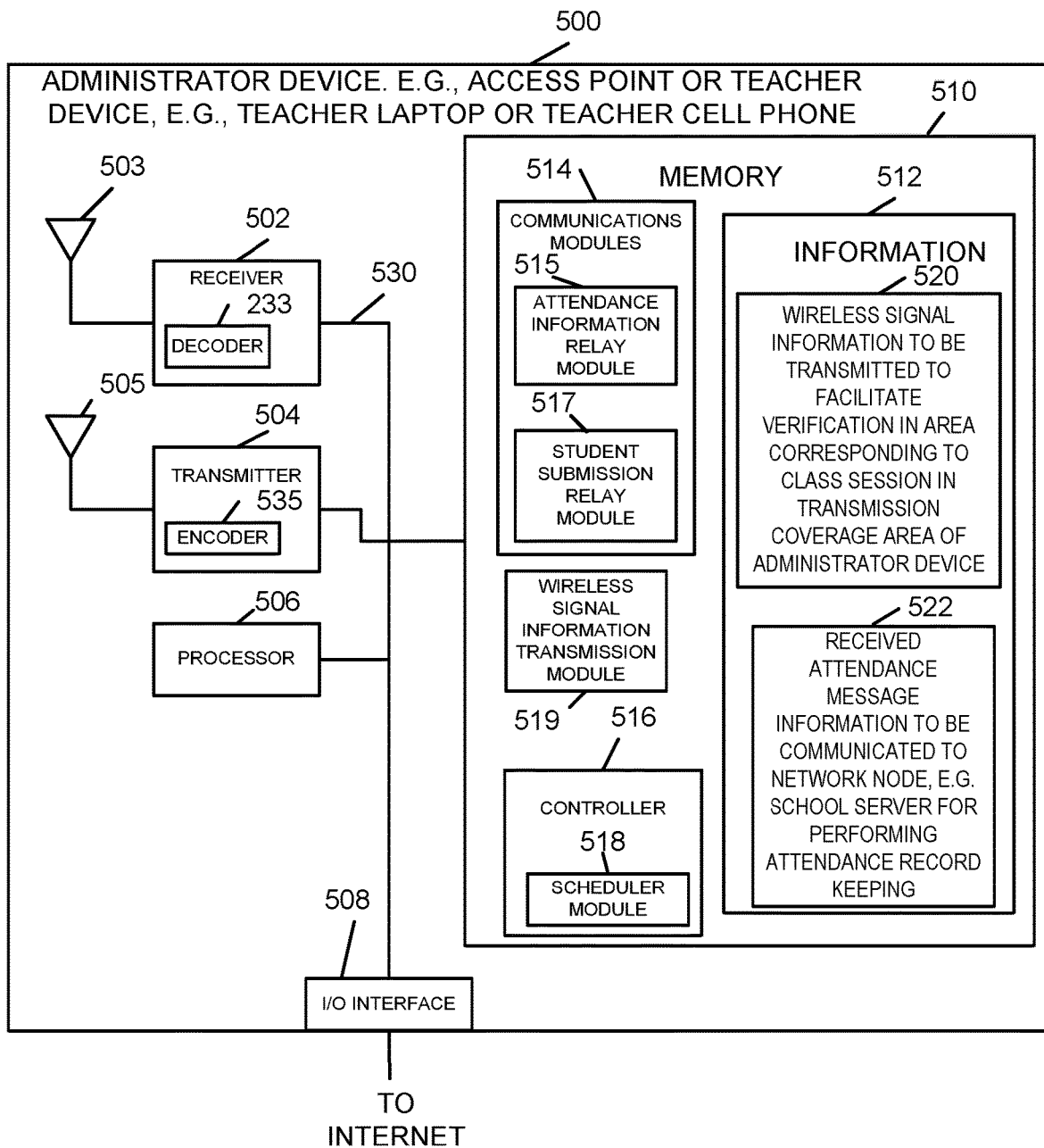
FIG. 5 illustrates an exemplary administrator device that can be used as a teacher device or access point of the system shown in FIG. 1.

FIG. 5 is a drawing of an exemplary administrator device 500, e.g., an access point or teacher device, e.g., a teacher laptop or teacher cell phone, in accordance with an exemplary embodiment. Administrator device 500 includes a receiver 502, a transmitter 504, a processor 506, e.g., a CPU, an I/O interface 508 and memory 510 coupled together via a bus 530 over which the various elements may exchange data and information. Receiver 502 is coupled to receive antenna 503 via which the administrator device 500 may receive wireless signals, e.g., wireless signals from students in a classroom. Receiver 502 includes a decoder 533 configured to decode received wireless signals and recover the information included in the wireless signals, e.g., attendance messages, student submission messages, student work assignment submission, student test result submission etc. Transmitter 504 includes an encoder 535 configured to encode information to be transmitted, e.g., information 520 to be transmitted by device 500 during time periods associated with class sessions to facilitate establishment by students of presence in the class. Transmitter 504 is coupled to transmit antenna 505 via which the administrator device 500 transmits wireless signals. Transmitted wireless signals short range wireless signals to students in the classroom during a class session.

Memory 514 includes communications modules 514 including an attendance information relay module 515 and a student submission relay module 519, a wireless signal information transmission module 519, a controller 516 including a scheduler module 518, and information 512. Information 512 includes wireless signal information 520 to be transmitted to facilitate verification in an area corresponding to a class session in transmission coverage area of the administrator device, e.g., during the class session. Information 512 further includes received attendance message information 522 to be communicated to a network node, e.g., a school server for performing attendance record keeping. Attendance information relay module 514 relays received attendance information received from students in the classroom to a network node, e.g., a school server supporting attendance record keeping. In some embodiments, attendance information relay module forwards a received individual attendance message which was received from students in the classroom to the network node, e.g., with the attendance information relay module 514 forwarding a plurality of messages, each message corresponding to an individual student. In some other embodiments, the attendance information relay module aggregates information received from multiple students in the class before forwarding the received attendance information to the network node, e.g., in an aggregated attendance message. Student submission relay module 512 forwards a received student submission message and a received corresponding work assignment student submission or test result student submission to a network node, e.g., a school server supporting record keeping of work assignments and test results.

Figure 6:
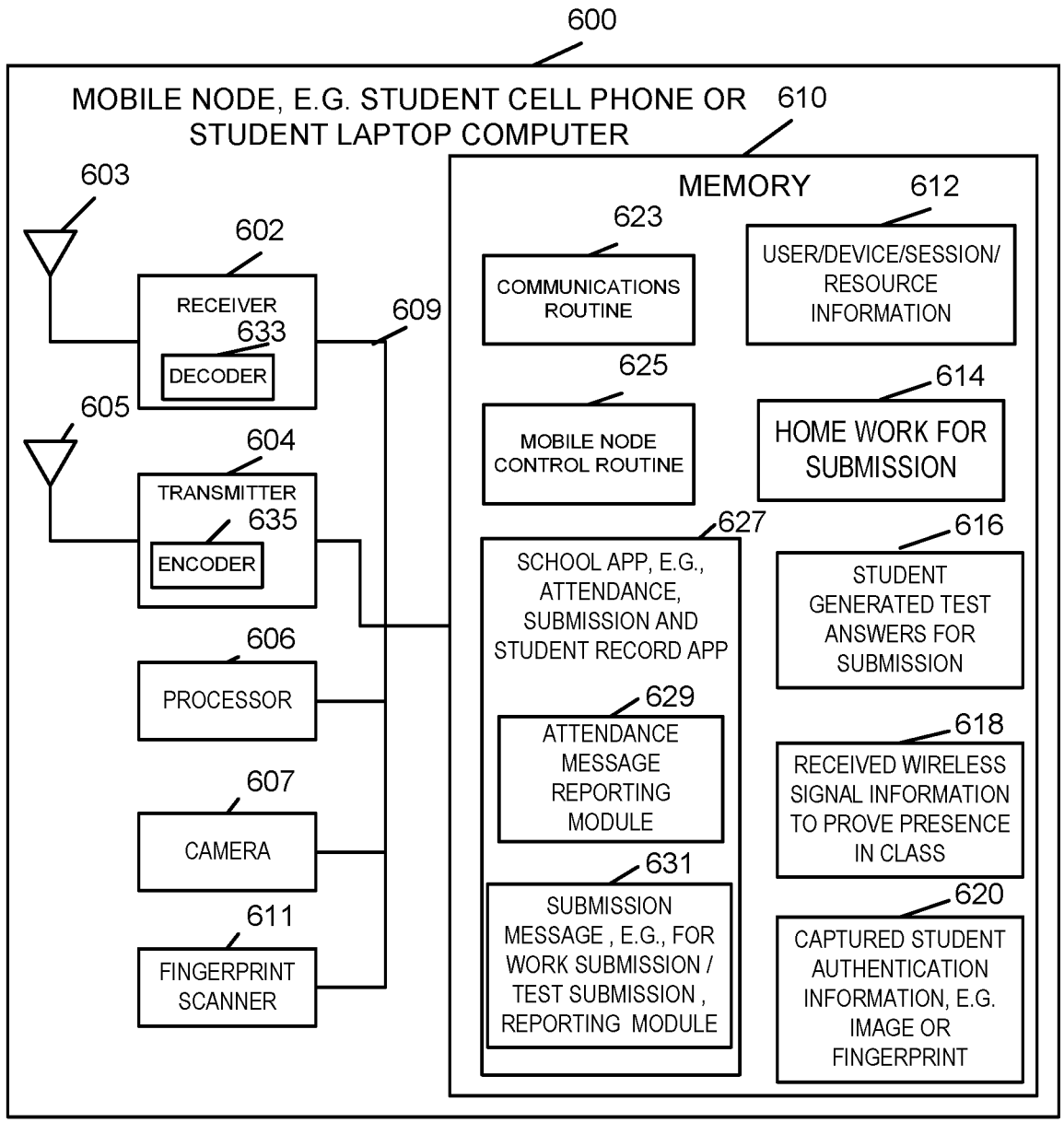
FIG. 6 illustrates an exemplary student device, e.g., cell phone or laptop computer, which can be used as a student device in the system of FIG. 1.

FIG. 6 is a drawing of an exemplary mobile node 600, e.g., a student cell phone or student laptop computer, in accordance with an exemplary embodiment. Exemplary mobile node 600 includes a receiver 602, a transmitter 604, a processor 606, a camera 607, a fingerprint scanner 611, and memory 610 coupled together via a bus 609 over which the various elements may exchange data and information. Receiver 602 includes a decoder 633 configured to decode received wireless signals. Receiver 602 is coupled to receive antenna 603 via which the mobile node 600 may receive wireless signals, e.g., wireless signals from an administrator device in a classroom in which the mobile device is located. Received wireless signals include, e.g., a received wireless signal communicating information to prove presence in class. Transmitter 604 includes an encoder 635 configured to encode information to be transmitted. Transmitter 604 is coupled to transmit antenna 605 via which the mobile node 600 transmits wireless signals, e.g., wireless signals to an administrator node, e.g., a teacher's laptop computer, a teacher's cell phone or an access node located in a classroom. Exemplary transmitted wireless signal include, e.g., a wireless signal communicating an attendance message, a wireless signal communicating a student submission message, a wireless signal communicating a work submission, e.g., homework information, a wireless signal communicating test results.

An image captured by camera 607, e.g., a self image of the student, e.g., student face image, with a corresponding date and time tag, may be, and in some embodiments, is used to authenticate a student, e.g., for attendance record keeping and/or for submission verification purposes. An fingerprint scan of a student's finger, captured by fingerprint scanner 611, with a corresponding date and time tag, may be, and in some embodiments, is used to authenticate a student, e.g., for attendance record keeping and/or for submission verification purposes.

Memory 610 includes a communications routine 623, a module node control routine 625, a school app 627, e.g., an attendance, submission and student record application. School app 627 includes an attendance message reporting module 629 and a submission message reporting module 631, e.g., for work submissions and test result submissions. Memory 610 further includes user/device/resource information 612, home work for submission 614, student generated test answers for submission 616, received wireless signal information to prove presence in class 618, e.g., identification information received from a broadcast beacon signal from a teacher device or an access point in the classroom in which the class session is occurring during the class session, and captured student authentication information, e.g., an image and/or a fingerprint of the student with date/time tag information.

Figure 7:
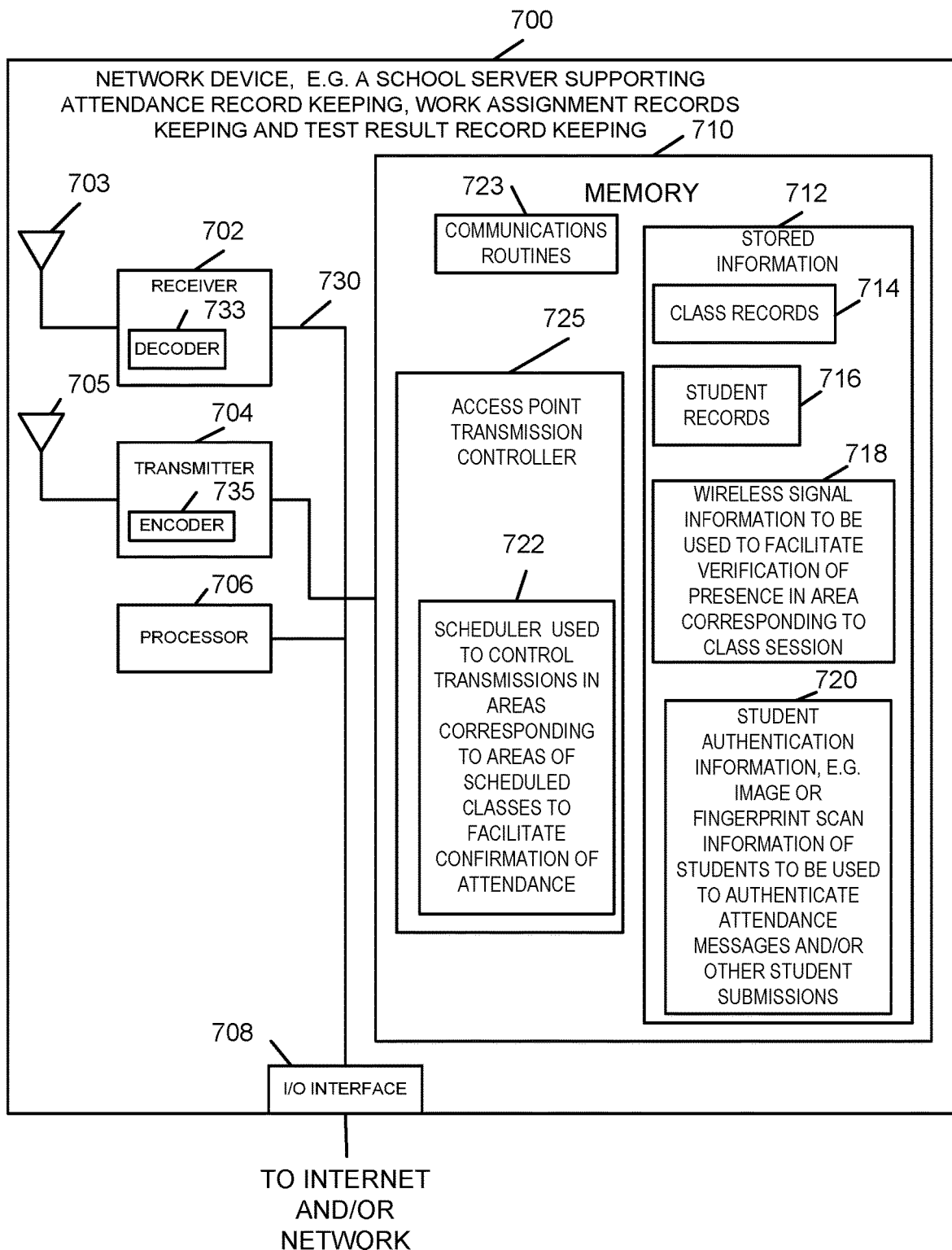
FIG. 7 illustrates an exemplary network node which can be used in the system of FIG. 1.

FIG. 7 is a drawing of an exemplary network device 700, e.g., a school server supporting attendance record keeping, work assignment record keeping and test record keeping, in accordance with an exemplary embodiment. Network device 700 is, e.g., network device 116 of system 100 of FIG. 1. Network device 700 is, e.g., a network device implementing the method of flowchart 200 of FIG. 2.

Network device 700 includes a receiver 702, a transmitter 704, a processor 706, and I/O interface 708, and memory 710 coupled together via a bus 730 over which the various elements may exchange data and information. Receiver 702 includes a decoder 733 for decoding received wireless signals. Receiver 702 is coupled to receive antenna 703 via which the network device may receive wireless signals. Transmitter 704 includes an encoder 735 for encoding data and information into wireless signals to be transmitted. Transmitter 704 is coupled to transmit antenna 705 via which the network device 700 may transmit wireless signals. I/O interface 708 is coupled to the Internet and/or a communications network, e.g., network 114. In various embodiments, network device 700 communicates with access points, teacher devices, and/or student devices, via I/O interface 708. In some embodiments, network device 700 communicates indirectly, via interface 708, with student devices via an access point, e.g., a fixed access point in classroom, or via a mobile teacher device serving as an access point, e.g. in a classroom during a class session.

Processor 706, e.g., a CPU, executes routines and uses data/information in memory 710 to control operation of network device 700 and implement the steps of a method, e.g., the method of flowchart 200 of FIG. 2. Memory includes communications routines 723, an access point transmission controller 725 and stored information 712. Stored information 712 includes class records 714, student records 716, wireless signal information to be used to facilitate verification of presence in an area corresponding to a class session 718 and student authentication information 720, e.g., image or fingerprint scan information of students to be used to authenticate attendance messages and/or other student submissions. Access point controller 725 includes a schedule 722 used to control transmissions in areas corresponding to scheduled classes to facilitate confirmation of attendance. In various embodiments, access point controller 725 controls transmission of at least some signals, e.g., some identification signals, to be transmitted by administrator devices, e.g., an access point with a coverage area including a classroom corresponding to a scheduled class or a teacher device, e.g., a teacher laptop or teacher cell phone, corresponding to a scheduled class session, which may serve as an access point.

In some embodiments, class records 714 is class record 400 of FIG. 4. In some embodiments, student records 716 is student records 300 of FIG. 3.

Figure 8:
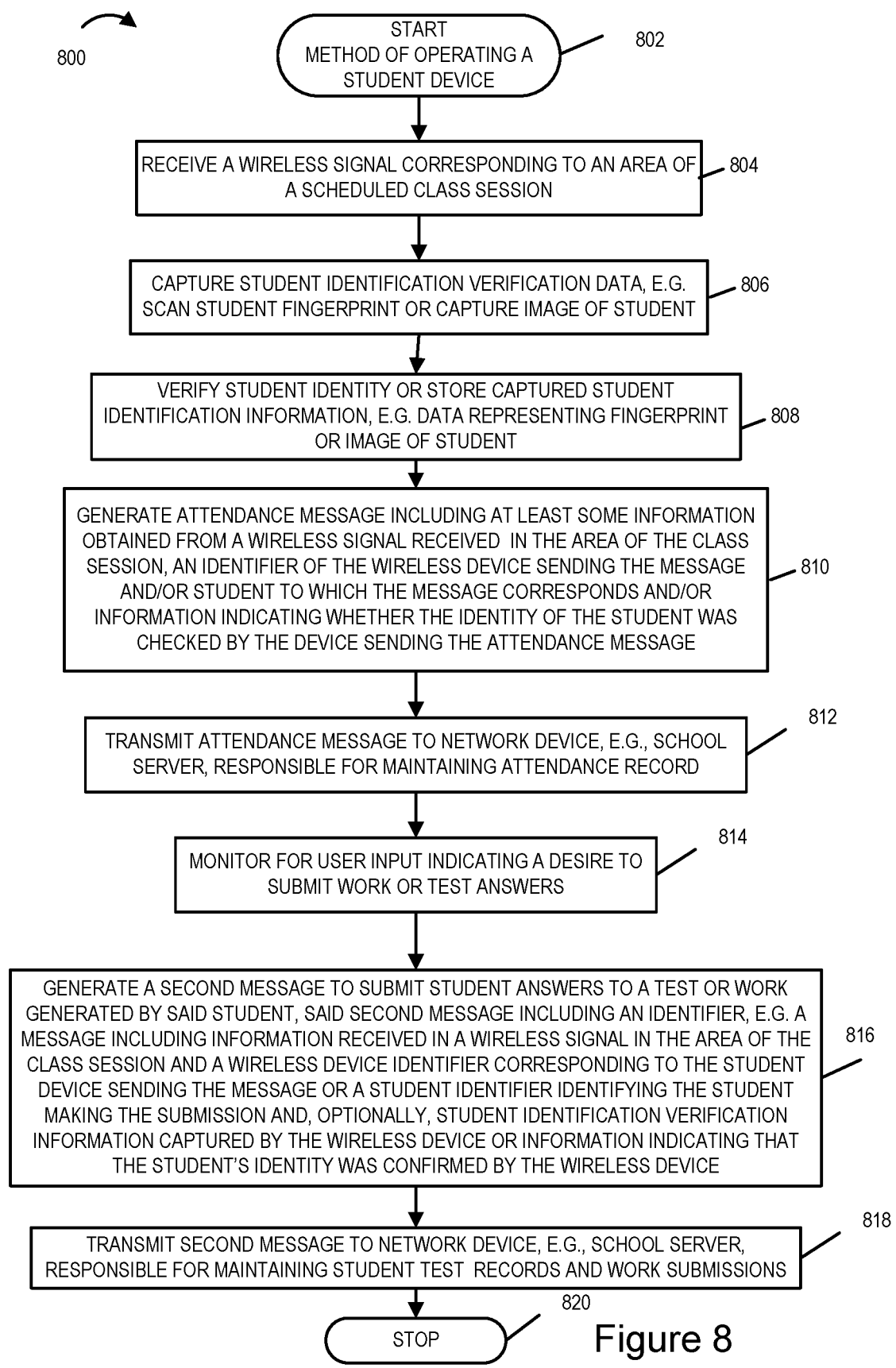
FIG. 8 is a flowchart 800 of an exemplary method of operating a student device

FIG. 8 is a flowchart 800 of an exemplary method of operating a student device, e.g., student device 110 of FIG. 1, student device N 112 of FIG. 1, and/or student device 600 of FIG. 6, in accordance with an exemplary embodiment. The student device implementing the method of flowchart 800 is, e.g., a mobile node, e.g., a student laptop computer or student cell phone. Operation of the exemplary method starts in step 802, in which the student device is powered on and initialized. Operation proceeds from start step 802 to step 804 in which the student device receives a wireless signal corresponding to an area of a scheduled class session. Operation proceeds from step 804 to step 806. In step 806 the student device captures student identification verification data, e.g., the student device captures a student fingerprint scan and/or captures an image of the student, e.g. an image of the student's face. Operation proceeds from step 806 to step 808.

In step 808 the student device verifies the student's identity or stores captured student identification information, e.g., data representing the fingerprint or image of the student. Operation proceeds from step 808 to step 810. In step 810 the student device generates an attendance message including at least some information obtained from a wireless signal received in the area of the class session, and identifier of the wireless device sending the messages and/or student to which the message corresponds and/or information indicating whether the identity of the student was checked by the device sending the attendance message. In some embodiments, the attendance message further includes data representing the captured student identification and date/time tag information corresponding to the capture time. Operation proceeds from step 810 to step 812.

In step 812 the student device transmits the generated attendance message to the network device, e.g., school server, responsible for maintaining the attendance record. Operation proceeds from step 812 to step 814.

In step 814 the student device monitors for user input indicating a desire to submit work or test answers. Operation proceeds from step 814 to step 816.

In step 816 the student device generates a second message to submit student answers to a test or work generated by said student, said second message including an identifier, e.g., a messaging including information received in a wireless signal in the area of the class session and a wireless device identifier corresponding to the student device sensing the message or a student identifier identifying the student making the submission and, optionally, student identification verification information captured by the wireless device or information indicating that the student's identify was confirmed by the wireless device. Operation proceeds from step 816 to step 818.

In step 818 the student device transmits the second message to the network device, e.g., a school server, responsible for maintain student test results and work submissions. Operation proceeds from step 818 to stop step 820.

In some embodiments, the generated first and second messages are sent to the network device, e.g., a school server, via an access point in the vicinity of the classroom in which the class session, e.g., a fixed access point in the classroom or a teacher device serving as a temporary access point for the students during the class session.

Figure 9A:
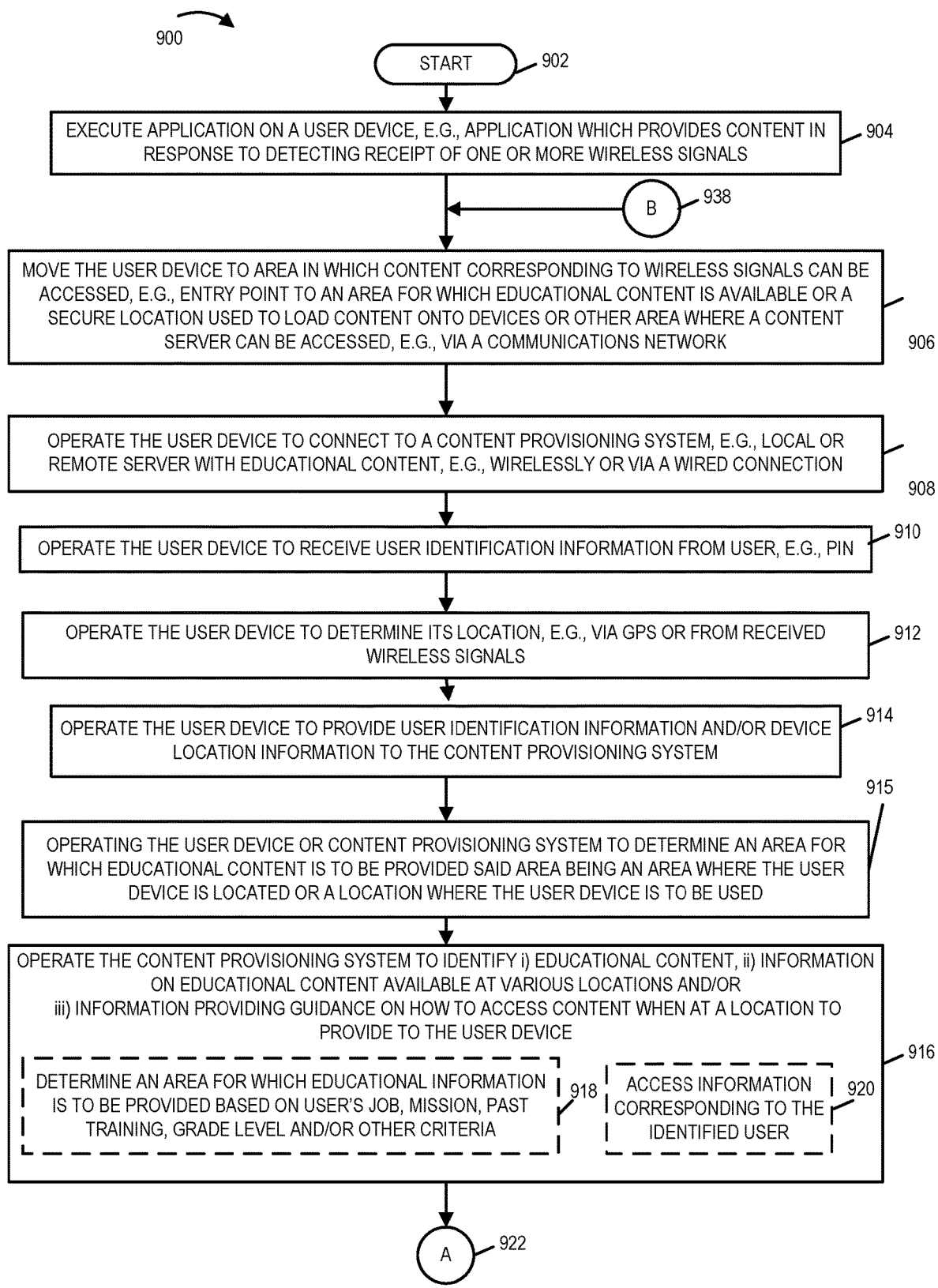
FIG. 9A is a first part of a flowchart of an exemplary method of providing information, e.g., educational information, in accordance with an exemplary embodiment.
Figure 9B:
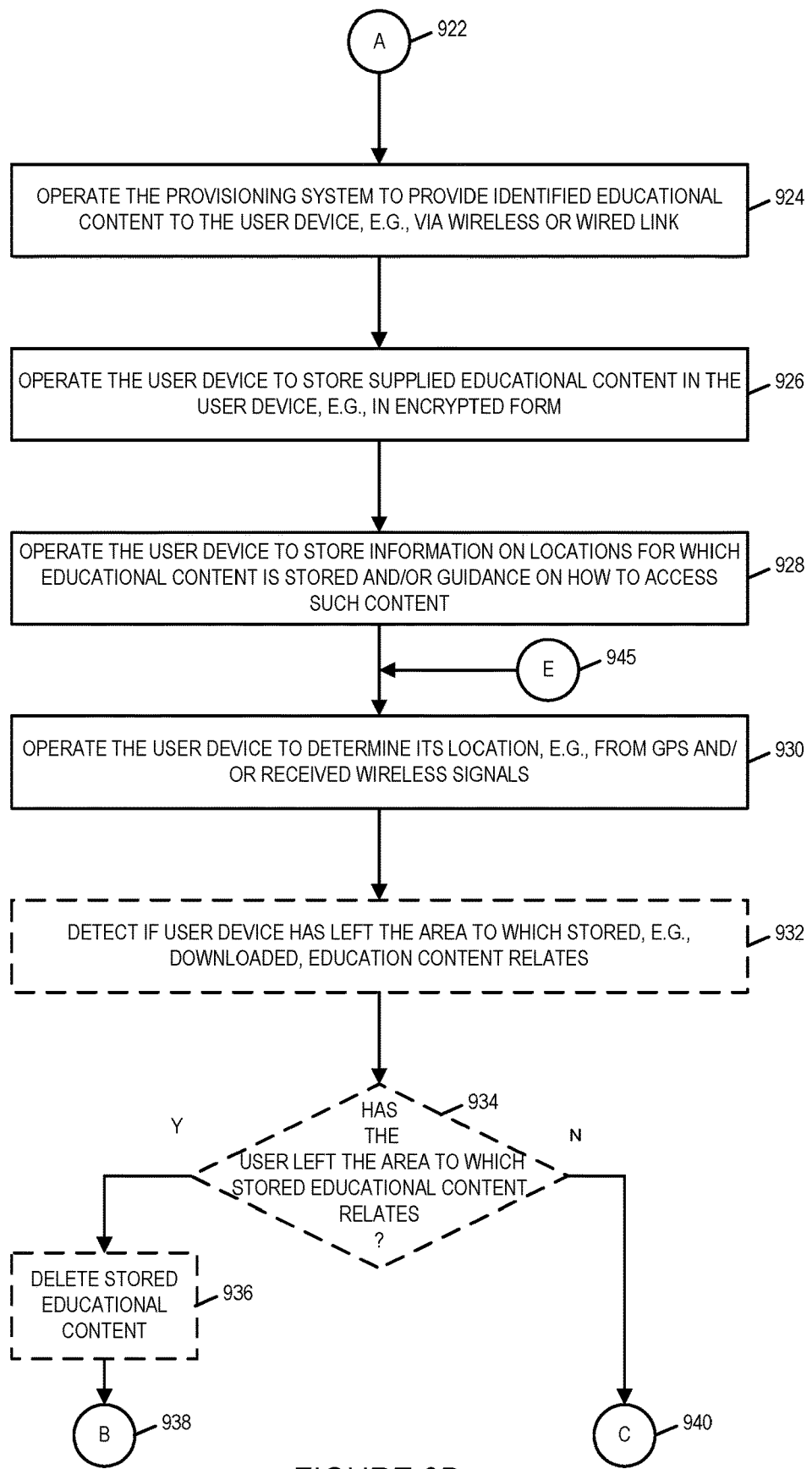
FIG. 9B is a second part of a flowchart of an exemplary method of providing information, e.g., educational information, in accordance with an exemplary embodiment.
Figure 9C:
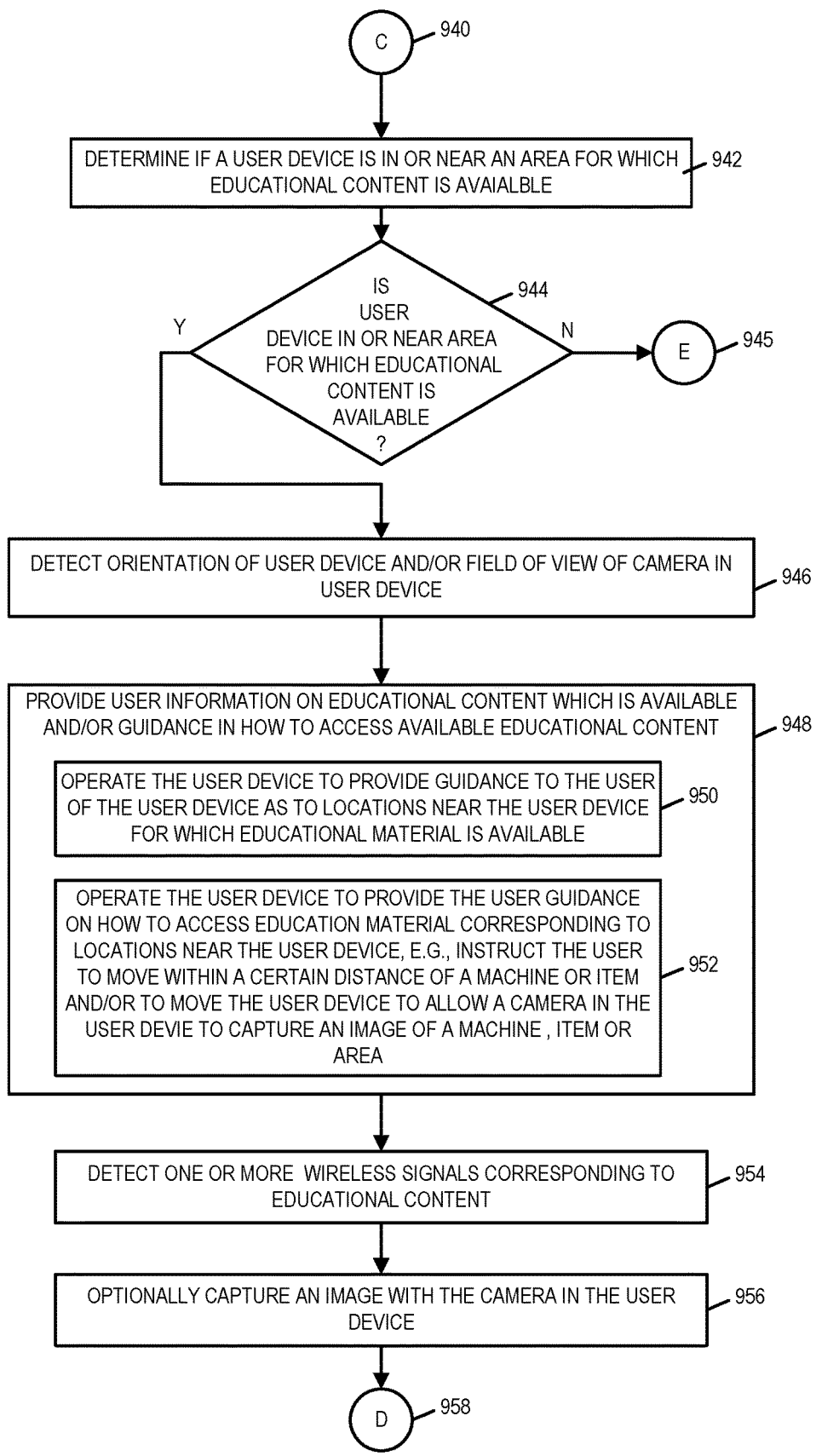
FIG. 9C is a third part of a flowchart of an exemplary method of providing information, e.g., educational information, in accordance with an exemplary embodiment.

FIG. 9 comprises the combination of FIGS. 9A, 9B, 9C and 9D. FIG. 9 and the exemplary method 900 of providing information, e.g., educational information, shown therein will now be discussed.

The method 900 starts in step 902, e.g., with the various devices, e.g., information server and/or user devices being powered on. The user device may include mobile devices such as cell phones capable of receiving wireless signals, capturing images, displaying images, and outputting audio among other things. The user device may and in some embodiments do include a wired interface in addition to one or more wireless transmitters and wireless receives along with a processor which controls user device operation in accordance with the invention. The user device also includes memory for storing information and/or control routines, an input device such as touch screen or keypad and one or more output devices such as a display and/or speaker. The display can be part of the touch screen allowing the screen to serve as both an input and output device. For purposes of explaining the invention the method will be explained using a single user device, e.g., a cell phone of an individual. The individual maybe a military person assigned to a military base, an employee of a company assigned to use maintain and/or service equipment or another individual such as a student visiting a museum with multiple items being exhibit. Beacon transmitters maybe and sometimes are located on items and/or at locations associated with an item or device for which educational information is available, e.g., training instructions, operating instructions, information about the item in the museum etc. The beacon transmitted by the beacon transmitter can be received by the user device and the information associated with the beacon or a set of beacons can be and sometimes is retrieved and presented to the user of the user device. The presentation maybe in the form of audio, video or an augmented reality experience. The augmented related experience as will be discussed below may and sometimes does involve displaying information associated with a received wireless signal as part of an image captured by the user device. Thus the retrieved and displayed education information supplements the real time image providing, in some cases, an experience where the user views an area if he were looking through the display of the user device but with additional information, e.g., educational information being displayed in the environment which is not actually present or visible in the environment being displayed.

By using cell phones which are commonly carried by individuals as the user devices, the methods can be implemented at relatively low cost from a deployment perspective by using cell phones already owned and used by many users as the user device and by executing an application on the user device.

Figure 10:
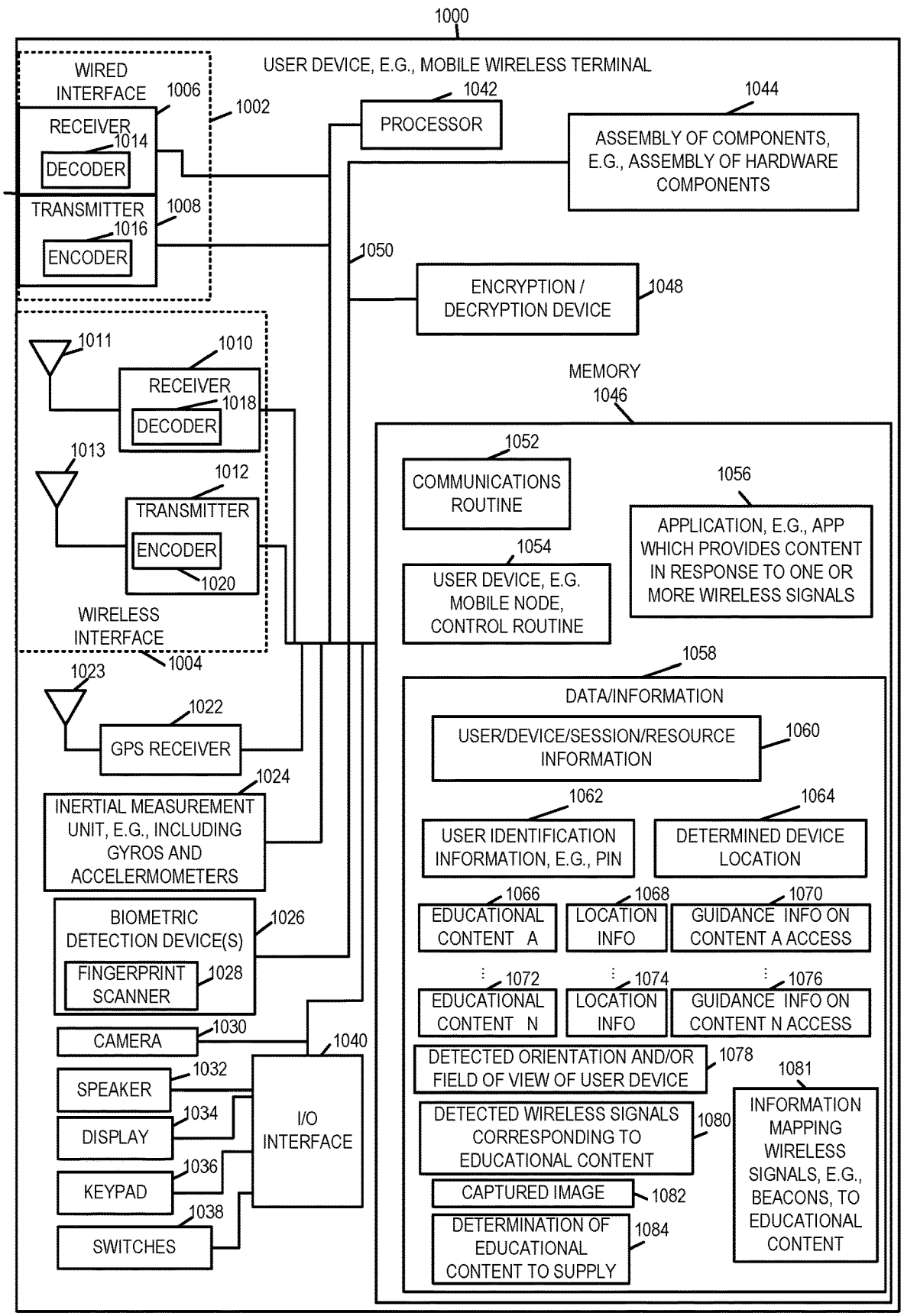
FIG. 10 is a drawing of an exemplary user device, e.g., a mobile wireless terminal, in accordance with an exemplary embodiment which can and sometimes is used as the user device of the method shown in FIG. 9.

In step 904 a user, e.g., the user device 1000 shown in FIG. 10, executes an application on the user device. The processor of the user device executing the application controls the user device to use various inputs and generate various outputs as well be discussed below. The inputs can and sometimes do include wireless signals, education information, GPS signals used to determine location, light corresponding to a scene area captured by a camera, user input etc. Outputs can include audio and/or still images and/or video images with the video and/or audio providing a virtual reality experience in some embodiments. With the execution being executed the user device will monitor for various inputs and generate various outputs.

With the application having been executed operation proceeds to step 906. In step 906 the user moves the user device to an area in which content corresponding to wireless signals can be accessed, e.g., retrieved for current or future use. While the area where content can be accessed maybe an entire area for which information is available it is normally a smaller area near an entry way used to allow users to load their devices with information relevant to the area being entered. This maybe and in some embodiments is an area where good wireless or wired connectivity exists to a communications network including an information server from which information associated with wireless signals in the area can be retrieved and/or information about the user of the device can be accessed and used to determine what training or other information should be provided to the user of the device given the area the user expected to be working in or moving through. The information server may, and normally does, store information for area where the user is expected to train, explore and/or visit during his employment or service. The information may and sometimes does include training information, information about items or devices in the area and/or other information. In the case where the area for which information to be provided is a military base the server may store information about machines and training relating to the military base.

While the area in which content corresponding to wireless signals can be accessed, it should be appreciated that the wireless signals that trigger the presentation of such information may cover only a very small portion of a geographic area for which information can be downloaded during the provisioning process during which information is downloaded.

The area in which content corresponding to wireless signals can be accessed, e.g., the area in which access to the information server is supported, is normally an area where multiple wireless signals can be detected at different locations in the area. For example, consider that a beacon transmitter may be placed on a machine or workstation and transmit an identifier signal which is associated with training information for the machine or workstation. The location covered by such a beacon can be relatively small and different from the area where access to the information server is possible. The area where access to the information server is possible maybe, and sometimes is, a secure area, e.g., a room in a military base, where content can be securely loaded onto the user device without being intercepted by devices outside the area or military base. In the case of a museum or zoo, the area where content can be accessed and stored for use maybe and sometime is an entrance area through which users pass when entering the museum or zoo. Consider for example that if WiFi signals are used to load a device with information latter provided in response to received beacon signals, the area where WiFi access to the information server is supported can be relatively small with inexpensive beacon transmitters being placed at various locations, many of which maybe outside the WiFi coverage area in which the information server can be accessed. By storing information on the device and providing the information in response to subsequently received beacon signals, the advantages of the invention can be achieved without requiring access to an information server throughout the geographic area in which information maybe provided in response to receipt of one or more wireless signals. Thus at least some features are directed to how to load and supply information onto devices which can then subsequently be provided in response to the receipt of one or more wireless signals associated with the information or a portion thereof.

While in some applications network access, e.g., Internet Access, is available in an entire area in which the method is used in many cases wireless access to a server which can provide information maybe limited to particular locations. In addition data rates at particular locations maybe limited. In cases where good wireless access is available at all times, there is may not be a need to download educational information prior to detection of a wireless signal that would trigger its presentation to a user of the user device. However, in many practical applications, as discussed above, there are areas where wireless access maybe limited or due to bandwidth constraints it maybe undesirable to have to contact a server to obtain information when a beacon or other wireless signal which could trigger the presentation of information is received. For example, in a school the large number of students may present bandwidth problems if all the students in the range of a beacon transmitter tried to access an information server, such as the server 1100 shown in FIG. 11, at the same time. In the case of a ship or building walls may block wireless signals making it difficult or impossible to wirelessly contact a server in a room where a device to which information is available is located. Accordingly, for a variety of reasons while in some embodiments a server is contacted in response to receipt of a wireless signal to obtain information to be presented in response to receipt of the signal, in many embodiments information is loaded onto the user's device, stored therein until need, accessed in response to receipt of a corresponding wireless signal and the portion of stored information is then presented in repose to detecting receipt of the corresponding wireless signal.

The information server maybe and sometimes is located at a site where the invention is used and thus high speed Internet access or other network access to a remote location is not required for the loading of user devices with information. This can be particularly beneficial for remote locations, schools, and/or other sites where a local server can be deployed but access to a server in another state or remote location may not exist or maybe bandwidth constrained.

Once in a location where an information, e.g., content, server can be accessed operation proceeds to step 908 in which the user device is connected to the content provisioning system, e.g., information server, which maybe a local or remote server with education content. The connection to the sever maybe a wired or wireless connection depending on the embodiment with wired connections being used in some high security embodiments or where the amount of information to be loaded is large and wireless connectivity to the information server being used in many applications such as zoos, museums, small military bases, etc.

With connectivity to the information server having been achieved in step 908 operation proceeds to step 910 in which the user device receives identification information from the user, e.g., a PIN or other user identifier. The user identifier will normally identify an individual person and maybe an employee ID, military id, name or some other identifier which can be used to identify the user and access records or other information about the user.

Operation proceeds from step 910 to step 914 in step 914 the user device is operated to provide user and/or device identification information to the content provisioning server 1100 which is the information server that supplies information to be provided in response to wireless signal, e.g., with different information being associated with, and to be supplied in response to the receipt of, different wireless signals.

Then in step 915 the user device or content provisioning system determines an area for which educational content is to be provided, said area being an area where the user device is located or a location where the user device is to be used. For example the area may correspond to the area of a military base, zoo, museum or other geographic location where the user is expected to use the user device to view educational material which is to be presented in response to detection of a wireless signal.

In step 916 the content provisioning system 1100 identifies educational content, e.g., information, to be provided to the user device 1000 so that it is available to be supplied when a corresponding wireless signal or set of wireless signals is received. The information maybe and sometimes is for the area determined in step 915. The identified information normally includes different pieces of information that are associated with different wireless signals or sets of signals. For example an instruction manual for a first machine maybe information, e.g., first information, associated with a beacon signal, e.g., a first beacon signal, transmitted by a first beacon transmitter mounted on or near the first machine. An instruction manual for a second machine maybe information, e.g., second information, associated with a beacon signal, e.g., a second beacon signal, transmitted by a second beacon transmitter mounted on or near the second machine. While machines are used to explain the invention the wireless signal and corresponding information can correspond to any time of item and/or a particular location.

The information which is supplied to the user device in step 916 maybe and sometimes is user dependent and/or dependent on an employee function, job, past training level achieved, and/or other criteria which are determined in step 918 based on the received device, location and/or user identification information. In sub-step the provisioning system may access information about the identified user to make sure that the user is provided with information corresponding to his physical abilities and/or already achieved training level. For example, a user maybe provided with information relating to the next level of training on equipment available in an area where the user has received training on some of the available equipment but no some pieces of equipment. Information suitable for a student's grade level or personal background maybe and sometimes is retrieved in step 916. In addition to education information that will be presented in response to receipt of a corresponding wireless signal, in step 916 other information is identified such as information on education content at various particular locations in a geographic or other area for which information is supplied and/or information providing guidance on how to access content when at a location. The information about particular locations for which information is supplied can help a user identify locations where he can access education information regarding particular devices or machines, e.g., as part of a training exercise or simply while visiting a site such as a military base, zoo or museum. In addition to providing information about particular locations were a user should visit to obtain particular education content, the information may also include suggestions, e.g., guidance, for how to access content while at a given location. For example in embodiments where the user device support virtual reality, information on where a user should point a camera of the user device while at a particular location to take advantage of a virtual reality opportunity maybe provided. Such information can be used to overcome the technical problem of how to make a user aware of educational opportunities before they may be presented to the user in response to receipt of a wireless signal. It should be appreciated that without such prompts a user may visit a site and not notice or be aware of what locations or camera orientations should be used to access and/or take advantage of the educational opportunities made available by the methods discussed herein.

Operation proceeds from step 916 to step 924 via connecting node 922.

In step 924 the provisioning system provides identified education content that was identified in step 916 based on the received information to the user device so that it can be loaded and stored in the user device for future use when a wireless signal or signals is detected. Then, in step 926 the user device stores the supplied education content, e.g., information, in the user device. The information can be and sometimes is stored in encrypted form for security reasons with user access being limited to all or portions of the content until receipt of a wireless signal or set of signals corresponding to the stored content or portion of the stored content. In this way access of the information can be constrained to when the user is near the machine, item or device to which a particular piece of information is associated with receipt of the wireless signal corresponding to the device being evidence of proximity to the device, item or location.

A problem with such constraints on access is that a user may not be aware of where to move to trigger access to the information and/or a virtual reality experience that maybe used to provide downloaded educational information. However, the providing of location and guidance information of the type discussed in step 916 can help make the user aware of the educational opportunities prior to providing the user access to content that is not to be provided until the use is within range of a particular wireless signal or set of signals.

In step 928 the user device stores information on locations, e.g., particular locations at a site, which correspond to education content stored in step 926. The location information maybe in the form of a site map showing the location of particular items, exhibits machines and the paths between such items, exhibits and/or machines and/or a list of location information which can be supplied in response to a user query for a particular type of training, a query for information about an item or some other query. Information providing guidance about how to access content when at a location or how to make the most of a virtual reality opportunity by properly orientating a camera in the user device at a location may and sometimes is also stored in the user device as part of step 928.

Operation proceeds from step 928 to step 930 in which the user device is location is determined. The location information maybe used to determine what guidance information should be provided to the user based on the user device's current location. However, in some embodiments the location information is optional used in a security operation and/or device memory management operation.

It should be appreciated that in the case of military and/or other applications it might be desirable to take steps to make sure that information is available to a user while on a military base or in an area corresponding to a military operation but not when the user is off the base or outside the area of military operation. As discussed above upon entering an area corresponding to a military base or operation, the user device maybe loaded, potentially while in a secure area, with information that maybe and sometimes is then supplied when various wireless signals are encountered while the user is on the military base or in the area of a military operation. While encryption provides some level of security it would be desirable if access to military or other confidential information could be limited to the area in which the information is to be used. While wireless signal receipt as a condition for information access provides a level of security there is a risk that access could be achieved by other means, e.g., hacking or forcible assault on the device particularly when the device is taken off based or outside the area of military operation.

As a further security constraint in some embodiments educational content is automatically deleted from a user device when the user leaves the military base or area of military operation where the information is authorized to be used, e.g., based on proximity to a particular device as indicated by receipt of a wireless signal corresponding to the device.

Even in embodiments where security is not a concern from a memory management perspective it maybe desirable to delete education content which will not be accessible due to a user leaving an area such as a zoo or museum area where the education content will be accessible upon the receipt of one or more wireless signals transmitted at the zoo or museum.

In some embodiments where security and/or memory management is a concern, optional steps 932, 934 and 936 are implemented on the user device.

In step 932 based on the determined device location the user device detects if it has lever the area to which stored, e.g., downloaded, education content relates. For example a determination is made if the device has left a military base, zoom, museum or other location for which educational content was stored in the user device. In step 934 a decision is made as to what processing path should be taken based on whether or not the user left the area to which stored education content relates.

If in step 934 it is determined that the user left eh area to which stored education content relates operation proceeds to step 936 in which the stored educational content is deleted prior to operation retuning to step 906 via connecting node B 938.

If in step 934 it is determined that the user device has not left the area, e.g., base, zoom or museum for example, to which stored education content relates, operation moves to step 942 via connecting node C 940. In embodiments where the location based information deleting function is not supported, operation proceeds directly from location determination step 930 to 942.

In step 942 a determination is made, e.g., based on the determined device location, if the user device is in or near an area for which educational content is available. If the device is not in or near an area for which educational content is available, e.g., far away from locations where wireless signals might be received which could trigger a content access and presentation operation, device operation proceeds from step 944 back to location determination step 930 via connecting node E 945. As the user device moves a new location will be determined in step 930 and operation will proceed once again from step 930 to step 942.

If in step 944 it is determined that the user device is in or near an area for which educational content is available, operation proceeds to step 946. In step 946 orientation of the user device and/or the field of view of a camera in the user device is determined. This camera position and/or orientation information can be, and sometimes is used, to provide the user guidance on how to move and/or reorient the user device to receive a wireless signal to trigger content presentation and/or to capture an image which can be used as in a virtual reality operation in which educational information is presented along with at least a portion of a captured image.

Operation proceeds from step 946 to step 948. In step 948 the user device provides information on educational content which is available in a area in which the user device is located or a nearby area and/or guidance on how to access the available content position the user device to receive a signal or capture an image to be used in providing content.

In step 950 which maybe implemented as part of step 948 the user device is operated to provide guidance to the user as to locations near the user device for which educational material is available. For example in step 950 the user maybe shown or instructed that by moving the user device to a particular location in a room the user will be able to access content corresponding to a machine or item at that location. Such information can be and often is provided before the user is within range of the beacon signal which upon receipt will trigger the display of educational information corresponding to the machine. In step 952 which may also be performed as part of step 948 the user device is operated to provide the user guidance on how to access education material corresponding to locations near the user device. For example the user maybe instructed to move within a certain distance of a machine or item and/or to move the user device to allow a camera in the user device to capture an image of a machine, item or area which can then be displayed in combination with educational information, e.g., as part of a virtual realty experience. In this way the user is made of educational information access opportunities and how to take advantage of them if there is an interest in accessing the information.

Operation proceeds from step 948 to step 954. In step 954 the user device detects the receipt of one or more wireless signals corresponding to educational content. These signals maybe and sometimes are beacon signals transmitted by battery powered beacon transmitters placed on or near devices or items for which information is available.

In optional step 956, which is used in some virtual reality embodiments, one or more images are captured using the camera in the user device, These images can be combined with information as part of providing the user with a virtual realty experience.

Operation proceeds from step 956 to step 960 via connecting node D 958.

In step 960 the user device determines, based on one or more received wireless signals, what educational content to supply to the user. For example if a first beacon signal is received, stored educational information corresponding to the first beacon signal will be supplied. However, if a second different beacon signal is received, stored educational content corresponding to the second beacon signal will be supplied to the user.

In step 962 the educational content identified in step 960, is accessed, e.g., retrieved from memory or retrieved from a remote server so that it can be provided to the user of the device. Once the educational content to be provided has been retrieved, operation proceeds to step 964 in which the education content, identified based on one or more received wireless signals, is presented to the user of the user device, e.g., using the audio and/or video output capabilities of the user device. As part of step 964, steps 966 and 968 maybe and sometimes are performed. In step 966 the user device displays education content to a user of the device on a display of the user device and/or outputs audio via a speaker to provide the educational content in audio form. The educational content supplied to the user is the content identified in step 960.

Step 968 is implemented in embodiments that support virtual realty. In step 968 a virtual reality experience is provided to the user of the device by displaying at least some educational content identified in step 960 with at least a portion of an image captured by the camera of the user device. The educational content can be superimposed on a portion of the captured image and/or shown in a portion of the display used as a sub window adjacent at least some portion of a captured image. In some embodiments the virtual reality experience gives the user a view as if he were looking through the camera with the educational content being visible in the environment when such information is not really visible in the actual scene area where the image being displayed was captured.

Operation proceeds from step 964 to step 906 so that the process can continue over time as the user device is moved to a new location for which educational content can be downloaded and eventually presented. While detecting and presenting information corresponding to one beacon signal is discussed in the above example it should be appreciated that the user device may detect and display educational information corresponding to many different wireless signals and/or items prior to being moved outside a base, zoo, museum or other area for which educational information has been downloaded.

FIG. 10 is a drawing of an exemplary user device 1000, e.g., a mobile wireless terminal, in accordance with an exemplary embodiment. Exemplary user device 1000 includes a wired interface 1002 and a wireless interface 1004. Wired interface 1002 includes a receiver 1006 including a decoder 1014 and a transmitter 1008 including an encoder 1016. Wireless interface 1004 includes a wireless receiver 1010 including a decoder 1018 and a wireless transmitter 1012 including an encoder 1020. Wireless receiver 1010 is coupled to receiver antenna 1011 via which user device 1000 may receive wireless signals. Wireless transmitter 1012 is coupled to transmit antenna 1013 via which user device 1000 may transmit wireless signals. In some embodiments, the same antenna is used for both the wireless transmitter 1012 and the wireless receiver 1010. Exemplary transmitted signals transmitted via transmitter 1008 or transmitter 1012 include, e.g., signals communicating: user device identification information to a content provisioning system, user identification information to a content provisioning system, and user device determined location information to a content provisioning system. Exemplary signals received via receiver 1006 or receiver 1010 include, e.g., signals communicating education content, location information corresponding to the education content, and guidance information on accessing the content. Additional exemplary signals received via wireless receiver 1010 include wireless signals, e.g., beacon signals, corresponding to educational content.

User device 1000 further includes a GPS receiver 1022 and an inertial measurement unit 1024. GPS receiver 1022 is coupled to GPS antenna 1023, via which the user device 1000 may receive GPS signals. The GPS receiver 1022 determines user device location, user device velocity, and user device heading based on received GPS signals, and in some embodiments, based on additional information, e.g., from accelerometers, gyroscopes, and altimeter devices. Inertial measurement unit (IMU) 1024, e.g., an IMU on a chip, includes accelerometers and gyroscopes and outputs inertial measurement information, e.g., detected changes in velocity and detected changes in angular motion. In some embodiments, user device 1000 determines user device 1000 location based on GPS receiver information, inertial measurement information and/or detected wireless signals, e.g., from transmitters at known location with known transmit power levels, e.g., with different location determination techniques being used at different times based on the availability of different types of received signals.

User device 1000 further includes biometric detection devices 1026 including a fingerprint scanner 1028. The biometric detection devices are used to identify and/or authenticate a user of user device 1000. User device 1000 further includes a camera 1030, which captures images of devices, items, portions of devices, and locations. User device 1000 further includes an I/O interface 1040, speaker 1032, display 1034, keypad 1036, and switches 1038. I/O interface 1040 is coupled to the various input output devices (1032, 1034, 1036, and 1038, and couples the I/O devices to bus 1050. Display 1034 displays educational content to a user. In some embodiments, display 1034 superimposes educational content on images captured, e.g., by camera device 1030, and displayed in real time. Speaker 1032 outputs audio providing educational content in audio form to a user.

User device 1000 further includes a processor 1042, e.g., a CPU, an assembly of components 1044, e.g., an assembly of hardware components, e.g., circuits, memory 1046, and an encryption/decryption device 1048. Receiver 1006, transmitter 1008, wireless receiver 1010, wireless transmitter 1012, GPS receiver 1022, IMU 1024, biometric detection device(s) 1026, camera 1030, I/O interface 1040, processor 1042, assembly of components 1044, memory 1046, and encryption/decryption device 1048 are coupled together via bus 1050 over which the various elements may interchange data and information.

Memory 1046 includes a communications routine 1052, a user device, e.g., mobile node, control routine 1054, an application (APP) 1056, e.g., an APP which provides content, e.g., educational content, in response to one or more wireless signals, e.g., detected beacon signals, and data/information 1058. Data/information 1058 includes user/device/session/resource information 1060, user identification information, e.g., a PIN, a determined device location 1064, educational content A information 1066, location information 1068 corresponding to educational content A, and guidance information 1070 on access to content A, . . . , educational content N information 1072, location information 1074 corresponding to educational content N, and guidance information 1076 on access to content N, a detected orientation and/or field of view of the user device 1078, detected wireless signals, e.g., detected beacons, corresponding to educational content 1080, information mapping wireless signals, e.g., beacon signals, to educational content 1081, a captured image 1082, and a determination of which educational content to supply to the user 1084. Information mapping wireless signals, e.g., beacons, to educational content 1181 includes, e.g., information associating different beacons with different stored educational content, e.g., beacon 1 is associated with educational content A, while beacon 7 is associated educational content N.

Processor 1042 controls the user device 100 to implement steps of the method shown in FIG. 9, e.g., steps 904, 908, 910, 912, 914, 926, 928, 930, 932, 934, 936, 942, 944, 946, 948, 950, 952, 954, and 956.

Figure 11:
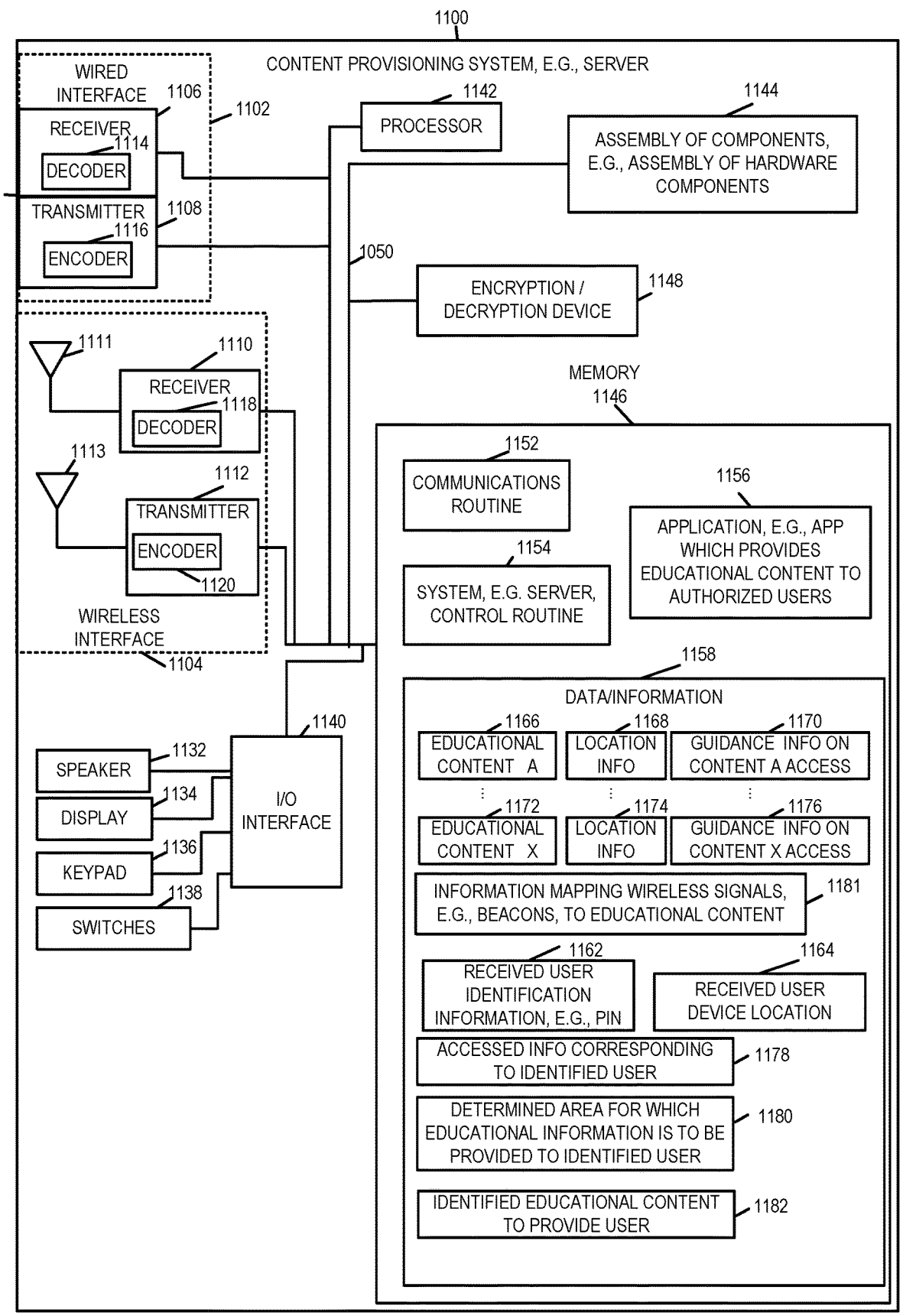
FIG. 11 is a drawing of an exemplary content provisioning system, e.g., content provisioning server, in accordance with an exemplary embodiment which can be and sometimes is used as the server which provides educational information to user devices in the method of FIG. 9.

FIG. 11 is a drawing of an exemplary content provisioning system 1100, e.g., content provisioning server, in accordance with an exemplary embodiment. Exemplary content provisioning system 1100 includes a wired interface 1102 and a wireless interface 1104. Wired interface 1102 includes a receiver 1106 including a decoder 1114 and a transmitter 1108 including an encoder 1116. Wireless interface 1104 includes a wireless receiver 1110 including a decoder 1118 and a wireless transmitter 1112 including an encoder 1120. Wireless receiver 1110 is coupled to receiver antenna 1111 via which system 1100 may receive wireless signals. Wireless transmitter 1112 is coupled to transmit antenna 1113 via which system 1100 may transmit wireless signals. In some embodiments, the same antenna is used for both the wireless transmitter 1112 and the wireless receiver 1110. Exemplary received signals received via receiver 1106 or receiver 1110 include, e.g., signals communicating: user device identification information from a user device, user identification information from a user device, and user device determined location information from a user device. Exemplary signals transmitted via receiver 1108 or transmitter 1112 include, e.g., signals communicating education content, location information corresponding to the education content, and guidance information on accessing the content.

Content provisioning system 1100 further includes an I/O interface 1140, speaker 1132, display 1134, keypad 1136, and switches 1138. I/O interface 1140 is coupled to the various input output devices (1132, 1134, 1136, and 1138, and couples the I/O devices to bus 1150.

Content provisioning system 1100 further includes a processor 1142, an assembly of components 1144, e.g., an assembly of hardware components, e.g., circuits, memory 1146, and an encryption/decryption device 1148. Receiver 1106, transmitter 1108, wireless receiver 1110, wireless transmitter 1112, I/O interface 1140, processor 1142, assembly of components 1144, memory 1146, and encryption/decryption device 1148 are coupled together via bus 1150 over which the various elements may interchange data and information.

Memory 1146 includes a communications routine 1152, a content provisioning system, e.g., content provisioning server, control routine 1154, an application (APP) 1156, e.g., an APP which provides educational content, e.g., selected educational content, to authorized users, and data/information 1158. Data/information 1158 includes educational content A information 1066, location information 1168 corresponding to educational content A, and guidance information 1170 on access to content A, . . . , educational content X information 1172, location information 1174 corresponding to educational content X, and guidance information 1176 on access to content X, accessed information corresponding to the identified user 1178, information mapping wireless signals, e.g., beacon signals, to educational content 1181, received user identification information 1162, e.g., a PIN, a received device location 1164, a determined area for which educational information is to be provided to the identified user 1180, and identified educational content determined to be provided to the identified user 1182.

Information mapping wireless signals, e.g., beacons, to educational content 1181 includes, e.g., information associating different beacons with different stored educational content, e.g., beacon 1 is associated with educational content A, while beacon 256 is associated educational content X.

Received user identification information 1162 includes, e.g., a PIN, login name, surname, detected user biometric information, password, etc.

Exemplary accessed information corresponding to an identified user 1178 includes, e.g., user job, title, service branch, user mission, past user training, authorized scheduled training, grade level, security clearance level, corporation affiliation, school affiliation, agency affiliation, class registry information, citizenship, language, certifications, and/or other criteria.

Identified educational content to provide to the user 1182 includes, e.g., a selected one more of the sets of stored educational content information (A, . . . , X) and corresponding location and guidance information, e.g., based on the accessed user information and the determined area for which the education information is to be provided to the identified user.

Processor 1142 controls the content provisioning system 1100, e.g., content provisioning server 1100, to implement steps of the method shown in FIG. 9, e.g., steps 916, 918, 920, and 924.

List of Exemplary Numbered Methods and Embodiments

1. A method for providing training or instructional material, the method comprising: operating a user device to receive one or more wireless signals; operating the user device to retrieve educational content associated with the one or more received wireless signals, said educational content including at least one or more of: i) information about a device, animal, artifact or location, ii) training information, or ii) equipment operating instructions; and operating an output device included in the user device to output retrieved education content (e.g., as video using a display and/or as audible signal via use of a device speaker).

2. The method of embodiment 1 further comprising: determining an area for which educational content is to be provided (e.g., determine area for which educational content is to be downloaded because the user is located in the area or likely to enter the area as part of his employment or service duties) said area being an area where the user device is located or a location where the user device is to be used (e.g., a military base or geographic region such as an area corresponding to a county or geographic region such as pacific ocean, Atlantic ocean, south America, Europe, middle east or even an area corresponding to a ship such as an aircraft carrier or particular ship which may move); downloading to the user device education material for the area; and storing in the user device the downloaded educational material.

3. The method of embodiment 2, further comprising: identifying (e.g., based on a user ID entered into the user device) a user of the user device; accessing information corresponding to the identified user; and providing educational content identified based on the identity of the user and said location.

4. The method of embodiment 3, wherein identifying educational content includes identifying educational content corresponding to i) training the user is to undergo, ii) the users job position or iii) a mission or task assigned to the identified user. (e.g. a military member or company employee may have his user device loaded with training information relating to his job or a mission he is to perform with the load of content taking into consideration the user's past training and/or experience level with different employees, military personnel or staff being provided different sets or educational content for the same geographic area based on their grade/training level, past training and/or job or mission).

5. The method of embodiment 2, wherein said determining, downloading and storing in the user device is performed prior to operating the user device to retrieve content associated with the one or more received wireless signals in said area (e.g., prior to the user starting a mission in the area or starting to use the device in the area of the base, e.g., with the training material being downloaded in a secure location of the base prior to start of the mission or user operation of the user device at the base for which information is downloaded).

6. The method of embodiment 5, wherein said downloading is performed in a predetermined area (e.g., secure location of military base or entry area of school, zoo or public conference where a direct device connection such as USB is available or hi-speed wireless is available, e.g., the entry area of a park, school, military base may support good quality WiFi which can be used to download training or other information reliably but WiFi or other wireless connections to a server may not be, and sometimes is not available at all locations in the area for which the training material is supplied, also the material may be provided from a local server avoiding the need for an Internet connection to obtain the material in this way schools without high speed internet can store training or other instructional material and provide it to students or personal who can then use their cell phones or other devices to store and access the content based on the signals they receive which maybe blue tooth, WiFi or other beacon signals from a device which may not have connectivity to the Internet or a server).

7. The method of embodiment 6, further comprising: detecting, in the user device (based on GPS or other device position information determined by the device into which content is downloaded) that the device has left the area to which the downloaded education content relates (e.g., user has left the military base or operating theater); and in response to the user device detecting the user leaving the area to which the education content relates, automatically deleting the downloaded content relevant to said area.

8. The method of embodiment 7, wherein said downloaded content is stored in encrypted form on the user device (for security reasons it is stored in encrypted form and deleted when the user leaves the area to which it relates, e.g., when the user leaves a military base, ship, geographic region to which the information relates, the information is automatically deleted from the use device for security reasons. In this way content can be loaded upon entry to a base or other location and automatically deleted when the user leaves the base or area); and wherein the content automatically loaded into the user device upon entry into the predetermined area (for example as the user enters a military base, zoo or school and passes through an entry area with high speed wireless connectivity the education content for the area in which the entry area is located is automatically loaded onto the users device and then when the user leaves the base or other geographic area to which the education content relates it is automatically deleted from the users device promoting security since the content will not continue to reside on the user device outside the area to which it relates).

9. The method of embodiment 1, further comprising: storing information as to specific locations in said area for which educational content is available (e.g. indicate area in room, or location of piece of equipment for which training information.

10. The method of embodiment claim 9, further comprising: determining, at the user device, (through the use of GPS, WiFi or other location determination techniques) the location of the user device; and providing guidance to the user of the user device as to locations near the device for which educational material is available or how to access educational material corresponding to locations near the device.

11. The method of embodiment 10, wherein providing guidance to the user as to locations near the device for which educational material is available includes providing a list of devices near the user or locations (e.g., in a room) near the user for which education material is available and some information on the educational material that is available (e.g., machine name, location of machine, and indication that operating instructions or training information for the machine is available with such information being provided potentially before the user device is in wireless signal range of one or more beacons associated with the machine or device thereby providing the user information as to where he should move so that the wireless signal(s) corresponding to the machine or device can be received and access of the education content of the material in response to wireless signal receipt will be triggered).

12. The method of embodiment 10, wherein said guidance includes instructions as to where the user should point a camera included in the user device to capture an image of a device or location for which educational content is available (e.g., instruction to point camera towards a particular portion of a room or towards a particular piece of equipment).

13. The method of embodiment 12, further comprising: detecting orientation or position of the camera and providing instructions to the user on how to move the camera (up, down, left or right) to capture an image of the area to which education content relates.

14. The method of embodiment 12, further comprising: displaying at least some of said educational content on a display screen with a portion of an image captured by the user device.

15. The method of embodiment 14, wherein said step of displaying at least some of said educational content on a display screen with an image captured by the user device includes: superimposing said at least some of said education content on said image or replacing a portion of said image with said at least some educational content while displaying another portion of said image alongside said at least some education content.

The methods and apparatus of the present invention are applicable to a wide range of communications systems which transmit signals, e.g., beacons signals including WiFi, Bluetooth, cellular and/or non-cellular systems.

In various embodiments nodes described herein are implemented using one or more modules to perform the steps corresponding to one or more methods of the present invention, for example, signal reception, signal processing, a determinations, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s)

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes and/or between beacon transmitters and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention Some embodiments are directed a non-transitory computer readable medium embodying a set of software instructions, e.g., computer executable instructions, for controlling a computer or other device to communicate information.

The techniques of various embodiments may be implemented using software, hardware and/or a combination of software and hardware. Various embodiments are directed to apparatus, e.g., a server such as an emergency management server. Various embodiments are also directed to methods, e.g., a method of providing emergency related information. Various embodiments are also directed to a non-transitory machine, e.g., computer, readable medium, e.g., ROM, RAM, CDs, hard discs, etc., which include machine readable instructions for controlling a machine to implement one or more steps of a method.

As discussed above various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

The techniques of the present invention may be implemented using software, hardware and/or a combination of software and hardware. The present invention is directed to apparatus, e.g., a server, a beacon transmitter, mobile nodes such as mobile terminals, non-management user devices, management person user devices, base stations, and a communications system which implement the present invention. It is also directed to methods, e.g., method of controlling and/or operating a server, a beacon transmitters, mobile nodes including user devices, base stations and/or communications systems, e.g., hosts, in accordance with the present invention. The present invention is also directed to machine readable medium, e.g., ROM, RAM, CDs, hard discs, etc., which include machine readable instructions for controlling a machine to implement one or more steps in accordance with the present invention.

Numerous additional variations on the methods and apparatus of the various embodiments described above will be apparent to those skilled in the art in view of the above description. Such variations are to be considered within the scope.

What is claimed is:

1. A method for providing training or instructional material, the method comprising:
    determining an area for which educational content is to be provided, said area being an area where a user device is to be used;
    downloading, while the user device is in a predetermined secure location which is a portion of said area where content can be securely loaded onto the user device without being intercepted by devices outside the area, said educational content including equipment operating instructions for equipment in said area;
    storing downloaded information in said user device, said download information corresponding to equipment associated with an identifier (ID), said ID being communicated in a wireless signal said information including equipment operating instructions for said equipment;
    operating said user device to receive said wireless signal including said ID;
    operating said said user device, in response to receiving said wireless signal including said ID, to retrieve the equipment operating instructions for said equipment associated with said ID; and
    operating an output device included in the user device to output the equipment operating instructions for said equipment associated with said ID.

2. The method of claim 1, further comprising:
    identifying a user of the user device;
    accessing information corresponding to the identified user; and
    providing educational content identified based on the identity of the user and said location.

3. The method of claim 2, further comprising:
    identifying educational content, wherein identifying educational content includes identifying educational content corresponding to i) training the user is to undergo, ii) the user's job position or iii) a mission or task assigned to the identified user.

4. The method of claim 1,
    wherein said determining, downloading and storing in the user device is performed prior to operating the user device to retrieve content associated with wireless signals in said area.

5. The method of claim 4, wherein said downloading is performed in a predetermined area where wireless connectivity is available for downloading training information and wherein wireless connectivity is not available at all locations in the area for which equipment operating instructions for equipment is downloaded.

6. The method of claim 5, further comprising:
    detecting, in the user device that the user device has left the area to which the downloaded educational content relates; and
    in response to the user device detecting the user device leaving the area to which the downloaded educational content relates, automatically deleting the downloaded educational content relevant to said area.

7. The method of claim 6,
    wherein said downloaded educational content is stored in encrypted form on the user device; and
    wherein the downloaded educational content was automatically loaded into the user device upon entry into the predetermined secure locaiton.

8. The method of claim 1, further comprising:
    determining a location of the user; and
    providing guidance to the user as to locations near the user device for which educational content is available, providing guidance to the user including providing a list of devices near the user or locations near the user for which educational content is available and some information on the educational content that is available.

9. The method of claim 1, further comprising:
    detecting orientation or position of a camera and providing instructions to the user on how to move the camera to capture an image of the area to which education content relates.

10. The method of claim 1, further comprising:
    displaying at least some of said retrieved equipment operating instructions on a display screen with a portion of an image captured by the user device.

11. The method of claim 1, wherein the area in which the user device is to be used is a military base.

12. The method of claim 11, wherein said predetermined secure location is a room in said military base.

13. The method of claim 11, wherein said predetermined secure location is an entrance area to the area in which said user device is to be used.

14. The method of claim 11, wherein storing downloaded information in said user device corresponding to equipment associated with an identifier (ID) includes storing the information in encrypted form.

15. A user device, comprising:
    a receiver for detecting the receipt of wireless signals;
    a camera;
    memory for storing educational information corresponding to equipment associated with an identifier (ID), said ID being communicated in a wireless signal, said educational information including equipment operating instructions for said equipment; and
    a processor configured to control the user device to:
        determine an area for which educational content is to be provided, said area being an area where the user device is to be used;
        download, while the user device is in a predetermined secure location which is a portion of said area where content can be securely loaded onto the user device without being intercepted by devices outside the area, said educational content including equipment operating instructions for equipment in said area;
        store downloaded information in said user device corresponding to equipment associated with said ID;
        receive said wireless signal including said ID;
        retrieve, in response to receiving said wireless signal including said ID, the equipment operating instructions for said equipment associated with said ID; and
        output the retrieved equipment operating instructions for said equipment associated with said ID.

16. The user device of claim 15, wherein the processor is further configured to:

receive, from a server, educational content for an area for which educational content is to be provided, said educational content including equipment operating instructions for equipment in said area, said area being an area where the user device is located or a location where the user device is to be used; and store in the memory the received educational content.

17. The user device of claim 15, wherein the user device is further configured to;

identify a user of the user device to a server; and wherein said retrieved educational content is educational content identified based on the identity of the user.

18. The user device of claim 17, wherein said retrieved educational content includes training material.

19. The user device of claim 15, wherein the user device is a cell phone; and wherein the processor is further configured to control the user device to:

display at least some of said equipment operating instructions on a display screen with a portion of an image captured by the camera of the user device.

* * * * *